United States Patent
Xu et al.

(10) Patent No.: US 10,410,350 B2
(45) Date of Patent: Sep. 10, 2019

(54) SKIP ARCHITECTURE NEURAL NETWORK MACHINE AND METHOD FOR IMPROVED SEMANTIC SEGMENTATION

(71) Applicant: Rakuten, Inc., Tokyo (JP)

(72) Inventors: Jiu Xu, Tokyo (JP); Bjorn Stenger, Tokyo (JP)

(73) Assignee: Rakuten, Inc., Tokyo (JP)

(*) Notice: Subject to any disclaimer, the term of this patent is extended or adjusted under 35 U.S.C. 154(b) by 81 days.

(21) Appl. No.: 15/798,349

(22) Filed: Oct. 30, 2017

(65) Prior Publication Data
US 2019/0130573 A1 May 2, 2019

(51) Int. Cl.
*G06T 7/11* (2017.01)
*G06K 9/66* (2006.01)
*G06N 7/00* (2006.01)
*G06N 3/08* (2006.01)

(52) U.S. Cl.
CPC .......... *G06T 7/11* (2017.01); *G06K 9/66* (2013.01); *G06N 3/084* (2013.01); *G06N 7/005* (2013.01); *G06T 2207/20081* (2013.01)

(58) Field of Classification Search
CPC . G06T 7/11; G06T 2207/20081; G06N 3/084; G06N 7/005; G06K 9/66
See application file for complete search history.

(56) References Cited

U.S. PATENT DOCUMENTS

| | | | |
|---|---|---|---|
| 5,988,862 A | 11/1999 | Kacyra | |
| 2010/0020093 A1 | 1/2010 | Stroila et al. | |
| 2010/0021012 A1 | 1/2010 | Seegers et al. | |
| 2010/0023250 A1 | 1/2010 | Mays et al. | |
| 2010/0275018 A1 | 10/2010 | Pedersen | |
| 2013/0346020 A1 | 12/2013 | Pershing | |
| 2016/0364617 A1 | 12/2016 | Silberschatz et al. | |
| 2017/0083796 A1 | 3/2017 | Kim et al. | |
| 2017/0112401 A1 | 4/2017 | Rapin et al. | |
| 2017/0124432 A1 | 5/2017 | Chen et al. | |
| 2017/0124711 A1 | 5/2017 | Chandraker et al. | |
| 2017/0140236 A1 | 5/2017 | Price et al. | |
| 2017/0147905 A1 | 5/2017 | Huang et al. | |

(Continued)

OTHER PUBLICATIONS

"Fully Convolutional Networks for Semantic Segmentation"; Jonathan Long, Evan Shelhamer, Trevor Darrell; May 20, 2016; arXiv.org>cs>arXiv:1605.06211; https://arxiv.org/abs/1605.06211.

(Continued)

*Primary Examiner* — Qian Yang
(74) *Attorney, Agent, or Firm* — HEA Law PLLC

(57) ABSTRACT

A method of using a computer to semantically segment an image using a convolutional neural network system where a processor configured to convolve an input image with a plurality of filters and outputting a first output volume, pool the first output volume and creating a first activation map, determine the level of influence of the first activation map on the semantic segmentation, up-pool the first activation map to form an output image having a same number of pixels as the input image, output a probabilistic segmentation result, labeling each pixel's probability that it is a particular label, and the determination of the level of influence of the first activation map on the semantic segmentation is done using a gate layer that is positioned between a pooling layer and an up-pooling layer.

20 Claims, 18 Drawing Sheets

(56) References Cited

U.S. PATENT DOCUMENTS

2018/0025257 A1* 1/2018 van den Oord ........ H04N 19/50
                                                    375/240.14
2018/0268220 A1* 9/2018 Lee ...................... G06K 9/4604
2018/0300855 A1* 10/2018 Tang .................... G06T 3/4053

OTHER PUBLICATIONS

CS231n Convolutional Neural Networks for Visual Recognition; Andrej Karpathy; http://cs231n.github.io/convolutional-networks/; Mar. 16, 2016.

* cited by examiner

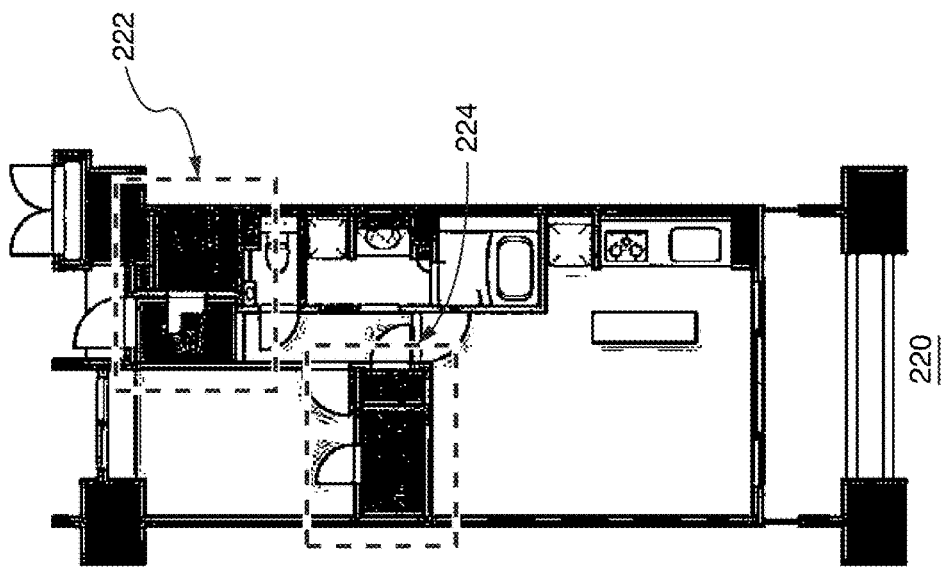
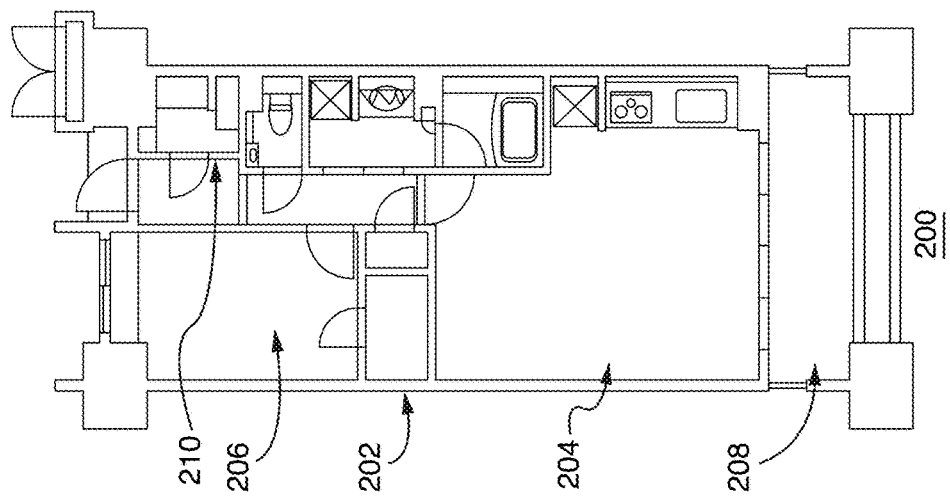
FIG. 2A

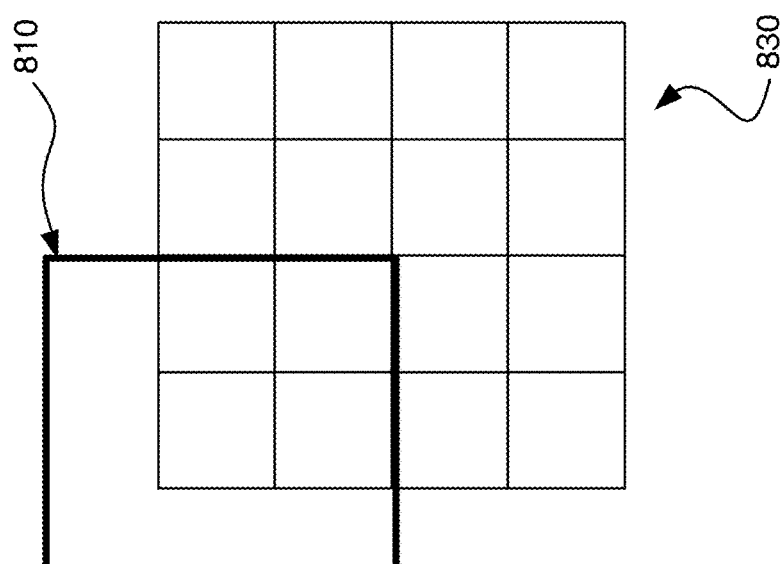
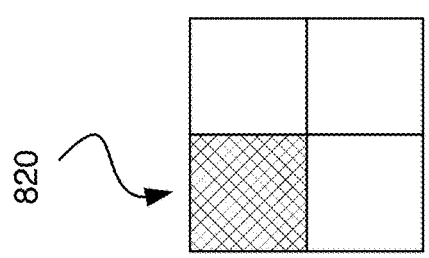
FIG. 8

SKIP ARCHITECTURE NEURAL NETWORK MACHINE AND METHOD FOR IMPROVED SEMANTIC SEGMENTATION

BACKGROUND

Image recognition and computer vision has been around since at least the 1960's when universities began pioneering artificial intelligence. Early on, when attempting image recognition, challenges such as viewpoint variation, scale, orientation, deformation, occlusion, illumination condition, background clutter, intra-class variation, object detection and recognition, and the like, emerged. Although improvements and advances have been made in these image recognition challenges over the last 50 years, current methodologies still have difficulty efficiently and accurately identifying images.

FIG. 1 is an example of an image which is very difficult to recognize using computer vision. FIG. 1 shows a typical floorplan image 2. As can be seen from the image, a variety of room spaces of varying dimensions are represented. Both pivoting doorways and sliding closet doors are depicted. Typical symbols representing appliances and fixtures are present. As can happen, area dimensions are given in divergent measurement terms: areas 10 are described in conventional Japanese measurements units of "j" or Jo while area 12 is described in measurement units of "$m^2$" or meters squared. Continuing, floorplan image 2 shows interior and exterior walls 8 and doors 6. Further, floorplan image 2 also shows bedrooms 10, balcony 12 and living room 14. Each additional item on the floorplan image shown in FIG. 1 increases the difficulty for a computer to recognize the image and the objects in the image. This is because more image processing is required for images with a greater number of objects. For example, each image object creates features such as lines, edges, corners, shapes, that must be extracted from the image data. Processing decisions must be made about each of these extracted features to determine the segmentation (pixel labeling) and object detection (classification of a group of pixels into a category). As can be appreciated, image recognition and computer vision processing require great amounts of computer processing resources.

FIG. 2A shows an example of poor image recognition of a floorplan image 200. As shown by the boxes 222 and 224 in image 220, the computer processing could not detect the areas highlighted therein. When looking at the corresponding areas of the input image 220, areas 202 and 210 had a higher degree of fine detail than other areas in the image 206, 204 and 208. This caused the computer to fail to recognize these areas of higher detail.

FIG. 2B shows another example of poor computer vision. In this example, vertical lies 280 in the input image caused problems for the computer attempting to recognize floorplan image 270. As shown in output image 275, the vertical lines have been interpreted to be a feature of the floorplan image 275, shown by boxed area 290.

SUMMARY

In view of the above noted computer vision technological problems, the inventors have created a new machine and method for efficiently and accurately processing crowded, finely detailed, and/or complex images. The inventors have invented a convolutional neural network system (hereinafter "CNN system" or "CNN") and method of selecting a fully convolutional neural network architecture that is trained end-to-end, pixel-to-pixel, and which is capable of receiving an input image and performing a semantic segmentation on image, efficiently and accurately. For example, a new layer is introduced into the network at the pooling layer, and the network learns during processing whether, and if so, to what extent, the pooling layer has any influence on the target image under processing. If the pooling layer does not have a threshold influence, the pooling layer can be skipped. This new network layer thereby creates a self-adaptive CNN architecture that allows the network to self-edit processing layers and, more importantly, to optimize architecture for increased processing efficiencies.

Further, the CNN's output segmented image has the same pixel size as the original image input image and the CNN semantically labels each image pixel. The disclosed convolutional neural network system and method for self-selecting the architecture thereof can make accurate pixel predictions and thereby improves whole-image classification as well as local region classification. This greatly enhances the CNN's ability to properly process and classify a variety of difficult images such as those described above. With the system described herein, a per-pixel classification can be made of every pixel in the image. This allows a fine granulation of details of the input images to be classified.

Convolutional neural networks can be computationally expensive, depending on factors such as network depth, number of filters, filter size, etc. Convolving images with numerous filters can lead to tremendous amounts of data being generated. Further, each additional layer added to the convolutional neural network likewise increases the computational cost. Images may contain hundreds to millions of pixels, and multiple mathematical operations are performed on a pixel by pixel basis in CNNs. As will be seen, the CNN system and architecture described herein efficiently segments images by removing unnecessary processing steps, resulting in a more efficient image segmentation.

A typical CNN system architecture consists of a series of convolutional layers, rectifying layers, and pooling layers. These sets of layers are arranged in series to process and segment an input image.

In a CNN system according to one embodiment, the output of each pooling layer is not only sent to the next convolutional layer, but can also be sent to a layer which scores the pooling; e.g. a scoring layer. This scoring layer maps the channels from the pool layer to the corresponding up-pool layer and can help to add more detail to the final segmented image.

However, not all pooling layers have a significant influence over the segmented image. The inventors have created a method for selecting a CNN system architecture that can remove, or determine whether to skip, the scoring layer for a given pooling layer thereby reducing the computational cost. Reducing computation cost is important when considering that it is desirable to perform image processing of the type discussed herein via a device with limited computational power, such as a mobile device or personal computer. For example, a semantic segmentation could be performed on a mobile device using the device's web browser, or for example, on a purpose-built application run on a device. This improved processing capability opens virtually limitless application possibilities.

For example, segmentation of images, such as floorplan images, can be performed in real-time and therefore any savings in processing time is desirable. Floorplan images are often used in real estate and elsewhere to provide a general spatial understanding of a building layout. The ability to reliably extract feature and dimension information from floorplan image data has a variety of uses. For example, floorplan images could be parsed and dimensional data added to the image's metadata. Such would allow processed floorplan images to be searched or sorted by desired room sizes or ranges. Alternatively, an apartment or home's potential buyer (or lessee) may wish to know if certain furniture will fit inside a room or down a hallway. This question can be answered with floorplan image processing according to the disclosure herein.

To date, the field of identifying parsing features of a floorplan image has primarily focused on processing high-resolution scans of floorplan images. Generally, previous attempts to parse these types of images have relied on image binarization. Image binarization is a technique that attempts to identify walls and other features of the floor plan image, with a 1 or 0. A 1 usually represents a solid feature such as a wall and a 0 usually represents open space, such as the interior of a room.

This image binarization approach had some success with very good high-resolution images of floorplans utilizing standard floorplan features and design practices. However, the overall real-world results were poor due to the wide variations in floorplan feature representations and floorplan image quality. This floorplan feature representation variation in combination with often old and low-resolution images meant that the previous method of image binarization failed at correctly classifying various features of the floorplan images.

Further, interactive two-dimensional (2D) to three-dimensional (3D) conversion of floorplans has been attempted. These image conversion techniques employ image binarization techniques, structure and text separation techniques, and symbol recognition and vectorization techniques. However, due to the difficulties with image binarization techniques noted above, these conversion techniques have failed to provide accurate floorplan detection results.

As can be appreciated, it is desirable to provide a floorplan image recognition and floorplan feature detection technique that can provide accurate analysis of low-resolution floorplan images. Further, it is desirable to provide a floorplan image recognition and floorplan feature detection technique that accurately identifies floorplan features. With the technology disclosed herein, floorplan image recognition and floorplan feature detection, and more specifically, floorplan image segmentation, has been improved by creating a device and method that outputs an accurately segmented floorplan image when using any type of input image, including a low-resolution input image.

In accordance with an embodiment of the disclosure, a device and method for providing floorplan image recognition and floorplan feature detection utilizing image analysis of low-resolution images is disclosed.

Further, in accordance with an embodiment of the disclosure, a device and method for providing floorplan image recognition and floorplan feature detection that accurately identifies floorplan features is disclosed.

Further, in accordance with an embodiment of the disclosure, a device and method for providing image recognition has been improved to create a device and method which allows a user to obtain a more quickly segmented image is disclosed.

Further, in accordance with an embodiment of the disclosure, a device and method for providing an improved self-adaptive image recognition architecture is disclosed. This system and method reduce computational costs when segmenting an image.

BRIEF DESCRIPTION OF THE DRAWINGS

The following drawings illustrate examples of various components of the invention disclosed herein and are for illustrative purposes only.

FIG. 2A shows an example of poor segmentation floorplan image;
FIG. 8 shows an example of fractional convolution.

DETAILED DESCRIPTION OF THE DRAWINGS

Figure 1:
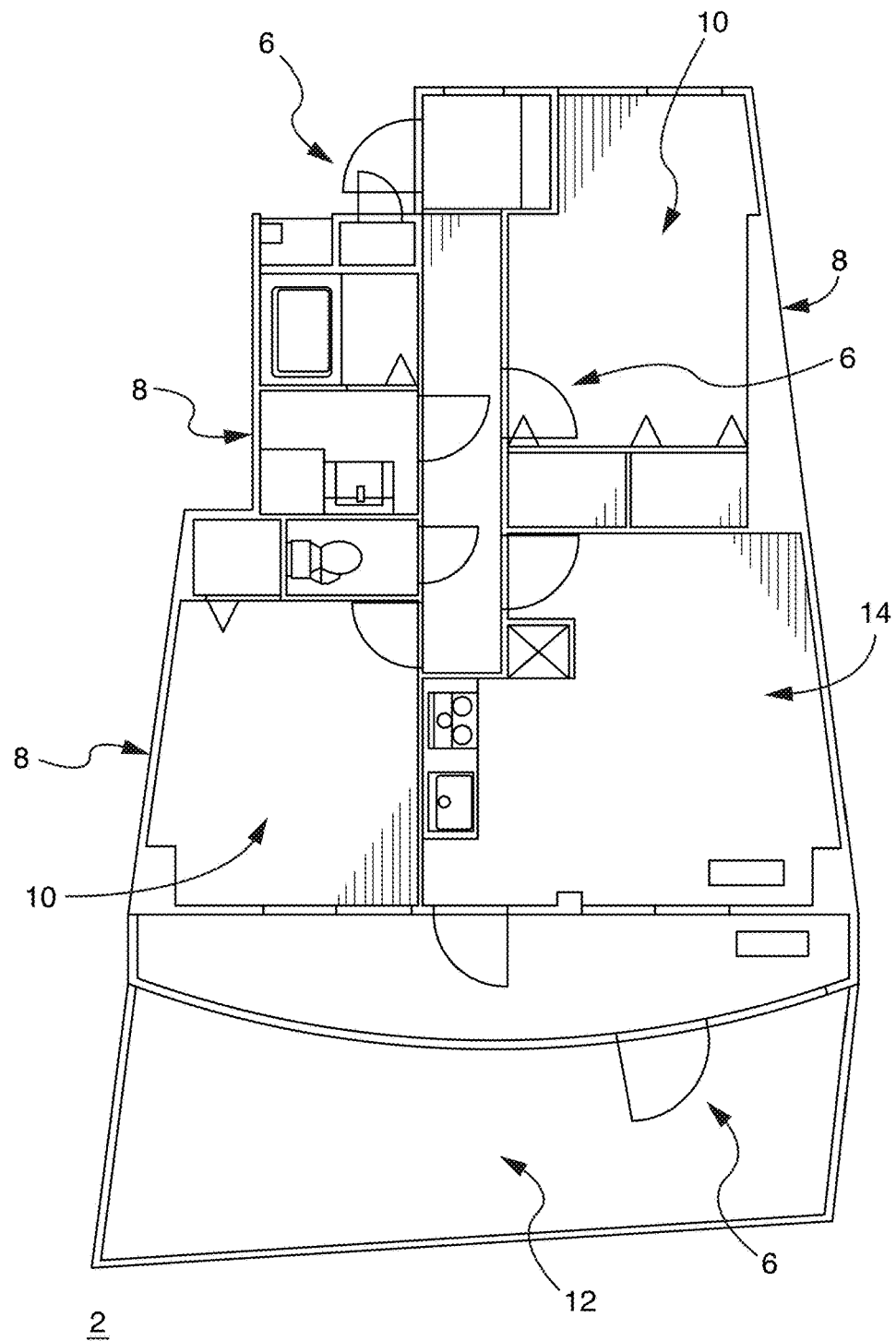
FIG. 1 shows an example of a floorplan image.
Figure 2B:
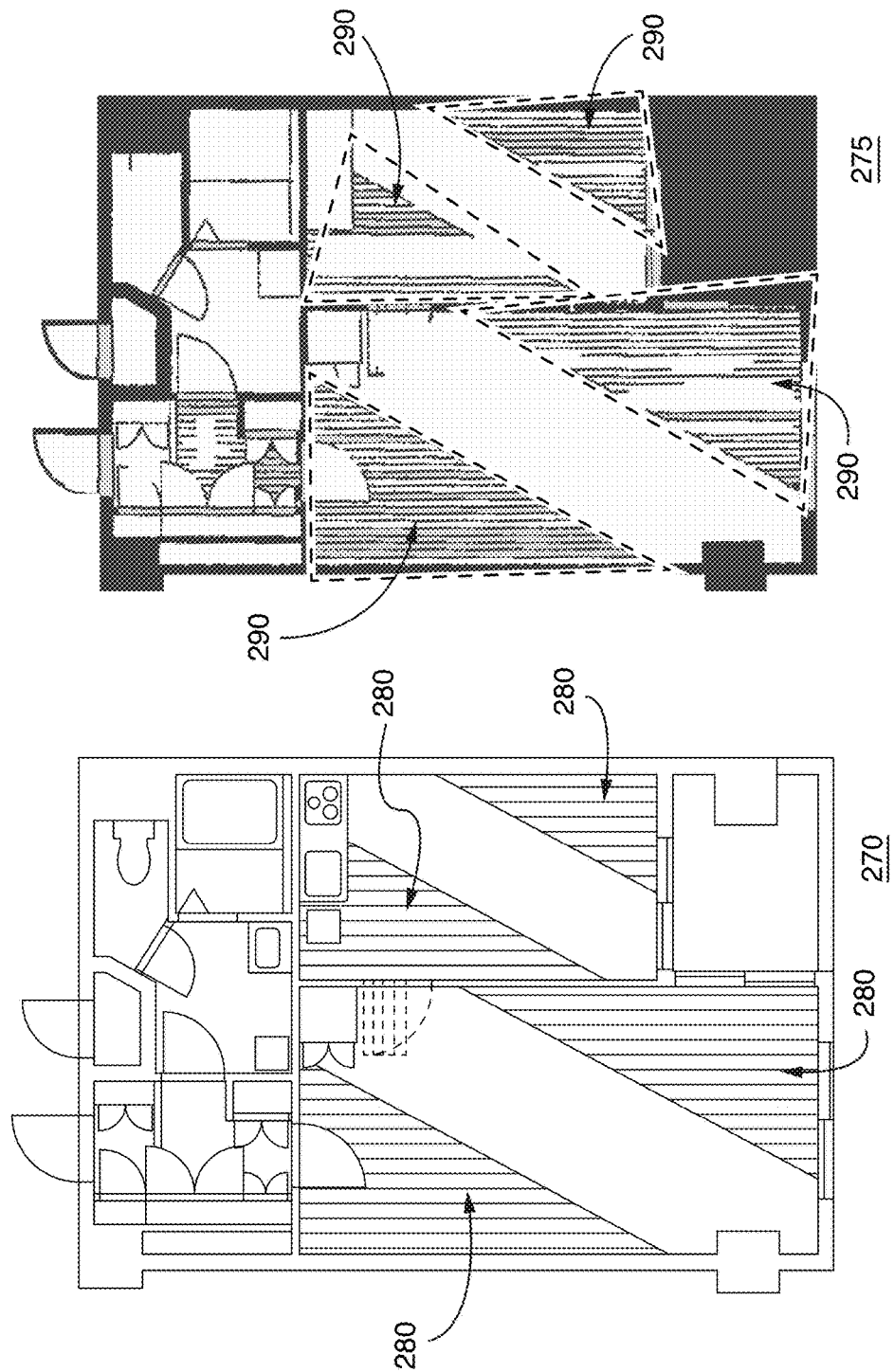
FIG. 2B shows a second example of poor detections in a floorplan image.

The area of neural networks and CNN's is a new and fast-moving field of computer science. As such, some of the terms used herein have not settled into standard parlance and often have several synonymous terms. For example, in this disclosure, terms such as feature map and activation map are used interchangeably. Other terms such as deconvolution and fractional convolution are still competing for the common acceptance among the computer vision community. At the time of this document, the inventors used the most commonly accepted terms; however, a person having ordinary skill in the art will understand, that although the terminology may change over time, the invention is directed to the concepts and methods disclosed herein irrespective of the terminology.

The present disclosure implements a learning-based approach to segment images and detect objects using fully convolutional neural networks it (FCNNs) hereinafter referred to as CNNs for short. Although not limited, hereto, the present disclosure will describe embodiments that are directed to segmenting floorplan images. A person of ordinary skill in the art will realize that, any image, not just floorplan images can be used with the invention described herein. For example, in one embodiment, the disclosed system could be used for image segmentation and detection for autonomous vehicles, architectural drawings, photographs, similarity search, CAD model generation, and 3D model creation for rendering, interactive three-dimensional walk throughs, furniture fitting, construction planning, etc. Additionally, the CNN system architectural selection disclosed herein can also be used with speech recognition, control systems, etc. The system as disclosed herein reduces computational costs associated with implementing a CNN system and therefore can be used in any application for which a CNN system is used.

Broadly, a CNN system works by using a multi-layered network which includes convolutional layers and pooling layers. In a convolutional layer, the image under processing is mathematically convolved with one of a plurality of filters in a convolutional operation. Pooling layers combine the outputs of a convolutional layer into the next layer for processing. For example, in max pooling, the max value of a group of pixels is selected to represent the group in the next convolution layer. Similarly, in average pooling, the average, of the represented values is selected to represent the group in the next convolutional layer. In a CNN system, filter weights or coefficients are learned in a training process. Training is a process where a set of training images are processed by the CNN system to obtain a segmentation hypothesis. Training images are used such that the correct segmentation answer to the image is already known. The correct segmentation image is known as a ground truth. Once ground truth images are known, an image to be processed is input into the CNN system. The output of the CNN system for this image can be compared against the ground truth image to determine how accurate the CNN system was at correctly labeling, or segmenting and identifying, the feature of the image.

An example of this is shown in FIGS. 12A, 12B and 12C, in which three floorplan images 1210, 1216, and 1222, respectively, are shown. The CNN system will receive these images as an input image and determine what features the floorplan images respectively contain. That is, the CNN system will determine where the waits of the floorplan image are, as an example. The CNN system determines where the walls of the floorplan image are on a pixel-by-pixel basis, whereby the CNN system determines a label of a particular pixel. For example, common labels for floorplans would include room, wall, window, door, bathroom, living room, bedroom, balcony, etc.

The ground truth image used in training is created generally created by hand; i.e. a person will analyze the floorplan image and determine the correct labels for each of the pixels in the floorplan. The ground truth image is the "correct answer" that the CNN system would ideally output for the particular input image. For example, as is shown FIGS. 12A, 12B and 12C, images 1214, 1220 and 1226 represent a ground truth image for images 1210, 1216, and 1222, respectively.

After processing, the CNN system of the present embodiment outputs a segmented image based on the input image, as shown for example, by reference characters 1212, 1218 and 1224.

Filters used in a CNN system are created/learned in a process called backpropagation. Using ground truth images as an ideal output of the CNN system, the CNN system's output is compared to the ground truth image. If the CNN system outputs a segmented image that is accurate and close to the ground truth image, then the convolutional filters receive little (or no) alteration, compared to if the CNN system outputs a segmented image that is further from the ground truth image. Determining the accuracy of the output image is discussed below. If the error in the CNN system output is large compared to the around truth, then the convolutional filters and voting weights will be more significantly changed. In this manner, the CNN system "is trained" or "learns."

More specifically, the CNN system convolutional filters can be altered using a gradient descent technique. The gradient descent can be used to adjust each filter and voting weight up or down a small amount to determine how the error changes. Large errors result in larger adjustments and small errors result in smaller adjustments. If there is no error, then no adjustment is made.

Figure 3:
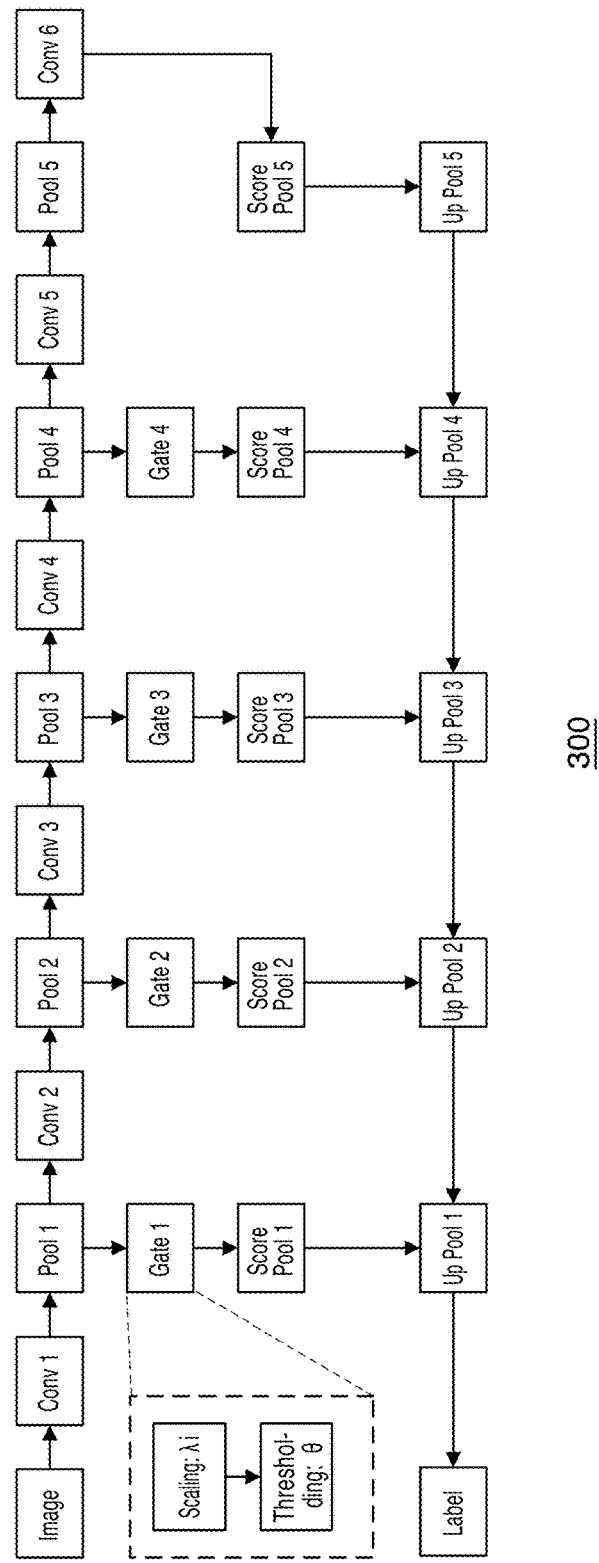
FIG. 3 shows a first embodiment of the invention before training.

Turning now to FIG. 3, an overview of the CNN system architecture of the present disclosure is provided. Generally, in the figures, the abbreviation "Con" or "Conv" followed by a digit represents a convolutional processing layer and the digit represents the respective convolutional layer number. The abbreviation "Pool" followed by a digit represents a pooling processing layer and the digit represents the respective pooling layer number. Similarly, the term "Up Pool" followed by a digit represents an up-pooling processing layer and the digit represents the respective up pooling layer number. As previously noted, pooling layers combine the outputs of a convolutional layer into the next layer for processing. This operation results in a reduction of the image size or image volume as the image moves through the respective convolution and pooling layers. Up pooling works in an opposite manner: in up pooling, the overall image size is increased as the number of pixels are increased in a manner described hereinbelow with respect to FIG. 7. Similarly, the scoring layer, comprising the Score Pools, and the Gate layer, comprised of Gates, are fully defined and described hereinbelow.

FIG. 3 shows an embodiment of an CNN system architecture for segmenting an input image. For example, the input image could be a floorplan image such as that shown in FIG. 1A. The CNN system of FIG. 3 has six different convolutional layers, Conv 1, Conv 2, Conv 3, Conv 4, Conv 5 and Conv 6. In alternative embodiments, the CNN system architecture is not limited to six convolutional layers. More or fewer layers could be used in the CNN system. If more layers are used, the additional layers tend, to result in an increased accuracy in the CNN system output, and may permit the CNN system to converge on a segmentation result quicker. However, more layers typically mean an increase in computational cost for the CNN system. Further, accuracy tends to increase when using more layers, but only up to a point. Once a CNN system has converged on a segmentation result, additional layers do not necessarily add any benefit in the output accuracy and simply require a higher computational cost.

In this disclosure, computational cost means any or all of the following: arithmetic steps by a CPU or GPU, memory used including volatile and non-volatile memory, power consumption, time used, among other things.

For a detailed discussion of a convolutional layer, please see section labeled "Convolution" hereinbelow.

A rectifying linear unit, commonly abbreviated as a ReLU can also be used in between the convolutional layers and the pooling layers. For ease of understanding the CNN system of FIG. 3, ReLUs have not been shown in the drawings. ReLUs, as the name suggest, rectify the output of a feature map so that any negative values become zero. For a discussion of a ReLU layer, please see the discussion below labeled "Rectifying Linear Unit."

The CNN system of FIG. 3 contains 5 pooling layers, Pool 1, Pool 2, Pool 3, Pool 4 and Pool 5. However, a CNN system architecture is not limited to five pooling layers. More or fewer pooling layers can be included in the network. The CNN system of FIG. 3 has a structure where the output of a convolutional layer is input to a pooling layer. For example, the output of Conv 1 is input into Pool 1. Note, however, that the Pool 1 layer has two outputs. The first Pool 1 output is fed into the second convolutional layer, Conv 2, and the second Pool 1 output is simultaneously input into Gate 1. Gates, in the disclosed CNN system, serve to scale the Pool output data (by a scaling factor $\lambda$) and to perform a thresholding function. This thresholding function is accomplished by a thresholding factor $\theta$ which serves to assess pooling layer activity and influence. For example, Gate 1 determines whether a score pooling layer is active, or active enough to have any meaningful impact in the output of the CNN system. The level of influence or activity of the pooling layer is determined by the hyperparameter $\theta$, discussed below. In general, if the in of the score pooling layer on the segmentation output is small, then the connection between the pooling layer and the corresponding up-pool layer is severed and the layer is said to be "skipped". This connection removal process will be discussed in more detail with respect to FIG. 4.

This same convolve-pool-convolve and gate structure is repeated through the Pool 4 layer. One output of the Pool 4 layer is input into the Conv 5 layer. The output of the Conv 5 layer is input into the Pool 5 layer. However, the Pool 5 layer has only a single output to the Conv 6 layer. This is because the CNN system in FIG. 3 has six convolutional blocks. Thus, output of the last convolutional layer, Conv 6, in practice will always be input into the corresponding up-pool layer. While the output of the Conv 6 layer does not necessarily have to be input into the up-pool 5 in all embodiments, if the Conv 6 layer as not active in influencing any pixel label designation, then the Conv 6 layer could be eliminated as the extra computation cost would not yield any increased performance in segmenting the image.

Returning back to the pooling layers, the second output of Pool 1, Pool 2, Pool 3, and Pool 4, is connected to the input of Gate 1, Gate 2, Gate 3 and Gate 4 respectively. The gates provide a thresholding feature of determining the amount of influence of the respective pooling layer on the designation of the image pixel label. The gates block or pass through data depending on the thresholding outcome. The Rates and their thresholding feature are discussed in the section titled "Gate" hereinbelow.

Once the thresholding of the gate is performed, the output of the pool layer is passed to the input of the corresponding score pool layer or Score Pool 4 on FIG. 3. This layer performs channel mapping or changing the dimensions of the output of the pool layer so that it matches the dimensions for the corresponding up-pool layer. The output of the pool layer can have an influence over the feature map of the corresponding up-pool layer, which has an influence over the ultimate label designation. For a detailed discussed of the channel mapping feature, please see the below section labeled "Score Pooling."

Convolution

A convolution with respect to a CNN system consists of using a two-dimensional filter (matrix) and taking a dot product (also known as a scalar product) over an entire volume (matrix) of the input space. This is repeated for every pixel in the input space and the result of this operation is called a feature map.

Figure 5:
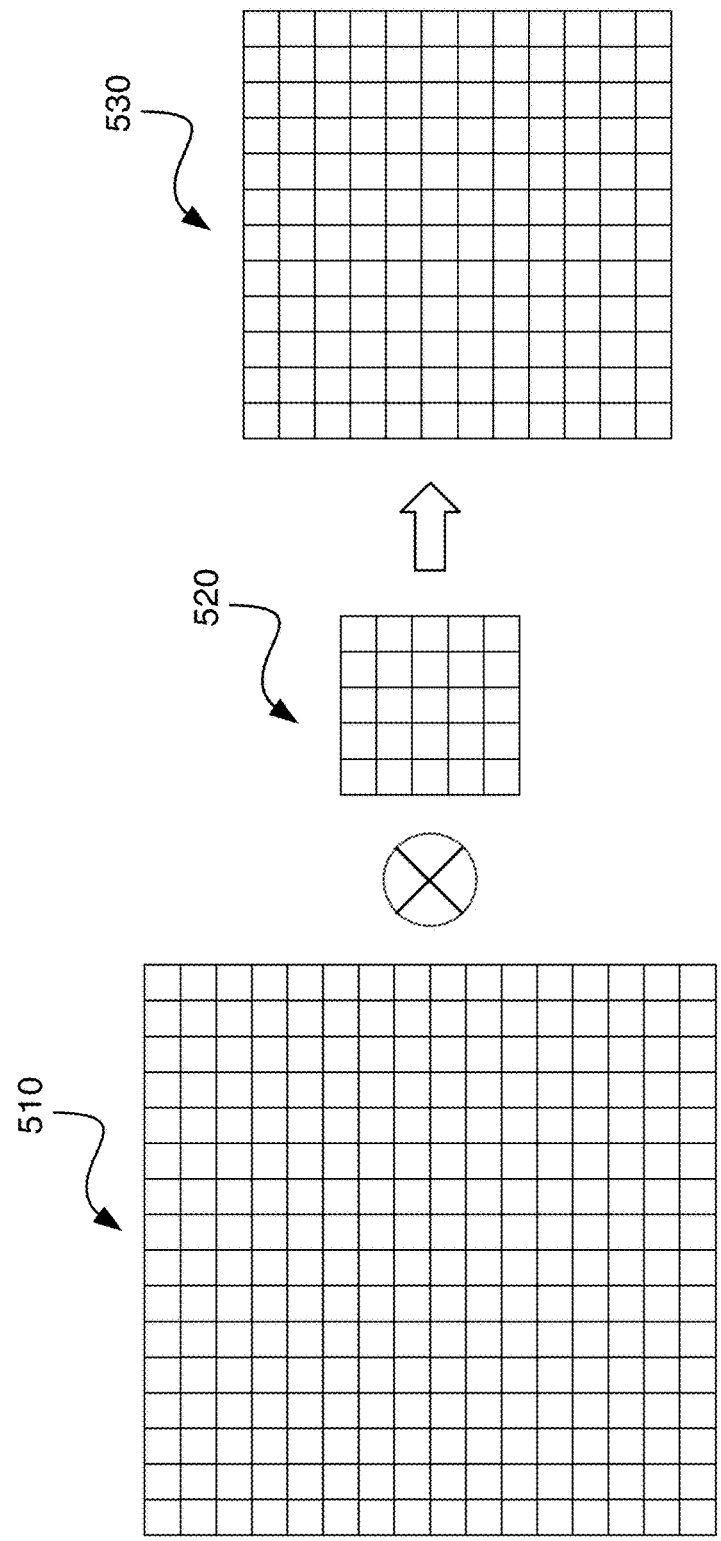
FIG. 5 shows an example of a convolution.

FIG. 5 shows an example of convolution layer processing that may occur, for example, in any one of the Conv 1 layers illustrated in the CNN system of FIG. 3. A convolutional layer is the core building block of a convolutional network. A convolutional layer typically operates by receiving an input volume which is a volume of data that represents an input image. In one embodiment, the input volume can be an image of 32 pixels by 32 pixels with 3 color pixels in depth. This can be written as a volume of 32×32×3 or thought of as a 32×32×3 array. In this case, 3 represents the depth of the image. This depth value is not to be confused with the depth of a CNN system, which can refer to how many layers, such as convolutional layers and pooling layers, a network has. For example, the CNN system depicted in FIG. 3 shows a depth of 6 blocks. However, each convolutional block can be composed of several convolutional layers. Further, the invention is not limited to the number of blocks shown in FIG. 3, and more or fewer blocks can be used in distinction, the input image volume of FIG. 5 has a depth of 3. The depth can also be used interchangeably with the number of channels and to avoid confusion, the term channel will be used hereafter. Thus, an image with a depth of 3 can also be said to have 3 channels. It is important to also note that image input volumes are typically much larger than those used for description here. For example, it is possible that the input image volume be 224×224×56, or larger.

In a CNN system, the input image volume is convolved with a filter. The purpose of the convolution step is to extract features from an image and this is accomplished by convolving a series of different filters with the image pixels. Each filter will function to highlight different aspects or features contained in the image volume. For example, certain filters will detect sharp vertical lines contained in an input image and other filters, for example, will detect edges between objects.

The filter has a smaller pixel area size than the target image. The typical filter is relatively small. For example, a filter could cover a pixel area of 3×3 or 5×5. Typically, convolutional filters comprise an odd number matrix pixel size but even number sized filters such as a pixel area of 2×2 or 4×4 are possible. A filter also has a depth/channel component. Using the example input image above that has 3 channels, a corresponding filter would be a 2×2×3 filter, 3×3×3 filter or 5×5×3 filter. A filter is, typically convolved over the full depth (or number of channels) of the input image.

The filter is placed over the input image volume at a starting corner. Once aligned in this manner, a pixel by pixel convolution is performed between a pixel in the input image and a corresponding pixel in the filter. After this operation, the filter is moved a fixed number of pixels and repositioned over the input image volume. The convolution operations are then performed again with the data found in this new position. This movement is called a "stride" and the number of pixels moved over is often referred to with the term stride. For example, if the filter is repositioned two pixels from the previous position, this is called "stride 2".

This convolution and striding operation is performed repeatedly until the filter has been moved or strided, across the entire input volume. This movement, or striding process, creates an activation map. This process is also called convolving.

As shown in FIG. 5, convolving a 32×32×3 input volume 510 with a 5×5×3 filter 520 is at stride 1 produces an activation map 530 that is sized 28×28×1. Note that the activation map is smaller than the input volume dimension. Padding, which is the process of adding a border of "0's" to the activation map before being forwarded to the next convolution layer (and application of a different filter) can be performed to achieve the same size output image as input image. Padding is typically performed in CNNs to ensure that the image size does not shrink over every convolutional layer.

The term "convolving" or convolution, as used herein, means calculating the dot product or inner product of the image vector and the filter vector. In mathematics, the "dot product" is an algebraic operation that takes two equal-length sequences of numbers, (for example, vectors) and returns a single number. Thus, the created activation map represents a set of data points that uniquely represent the dot product of the input image, vectors and the particular filter used in the convolution layer. Changing the applied filter changes the activation map. In this manner, filters extract different information from the input image via the convolution process.

A typical convolution layer contains many filters. Together, these filters are referred to as a filter bank. For simplicity of performing calculations, the volumes of the filters of a filter bank are generally the same size. Using the above example, a first filter could be a blue filter of volume 5×5×3, a second filter could be a red filter of volume 5×5×3, and a third filter could be a green filter of volume 5×5×3. The output of the blue filter would be an activation map which indicated where the blue pixels were located in the input volume. The output of the red filter would be an activation map which indicated where the red pixels were located in the input volume, and the output of the green pixels would be an activation map of where the green pixels would be in the input volume. The filters used in a convolution are independent of one another. That is, one filter does not have any influence on another filter. The three filters would output a set of three activation maps and taken as a whole, would produce a set of activation maps that have a total dimension 28×28×3, The filter set can be thought of as a re-presentation of the original input image.

Hyperparameters

Hyperparameters are variables in a CNN system that can be set according to the specific data being analyzed and there is not always an accepted best way of setting these variables. An example of hyperparameters are the number of filters used in the CNN system. The number of filters is often directly related the number of parameters being processed by the CNN system. As a CNN system can contain millions of parameters, setting the number of convolution layers is of done with respect to the memory constraints of the computer which is running the CNN system architecture.

In a like manner, the selected filter area size is a hyperparameter and is often selected based on the amount of available memory of the computer or processing system running the CNN system architecture.

The filter stride of the pooling layer is another example of a hyper parameter. Usually, filter strides are set to be small so as to capture fine detail in the parameter volume. However, larger stride numbers in applications where capturing fine detail is not critical have been shown to be effective and efficient.

The number of fully connected layers is also a hyperparameter and is often determined based on the amount of memory of the computer running the CNN system.

The number of convolutional and pooling layers is a hyperparameter.

It is noted that an important factor in determining the number of layers in the CNN system is the size of the training data set and the amount of time needed to train the CNN system. These hyperparameters are more fully discussed below in the section entitled "Training."

Rectifying Linear Unit

A rectifying linear unit, commonly abbreviated as a ReLU, rectify the output of a feature map so that any negative values become zero. Because filters can contain negative values, activation maps can also contain negative data values. Specifically, a ReLU layer applies art element by element activation function where the values are thresholded at 0. Thus, any negative value is set to zero. Any other value is multiplied by 1, simply giving back the original number. As an example, −6 would be rectified to 0; positive 6 would remain 6; and 0 would remain 0.

Pooling

Figure 6:
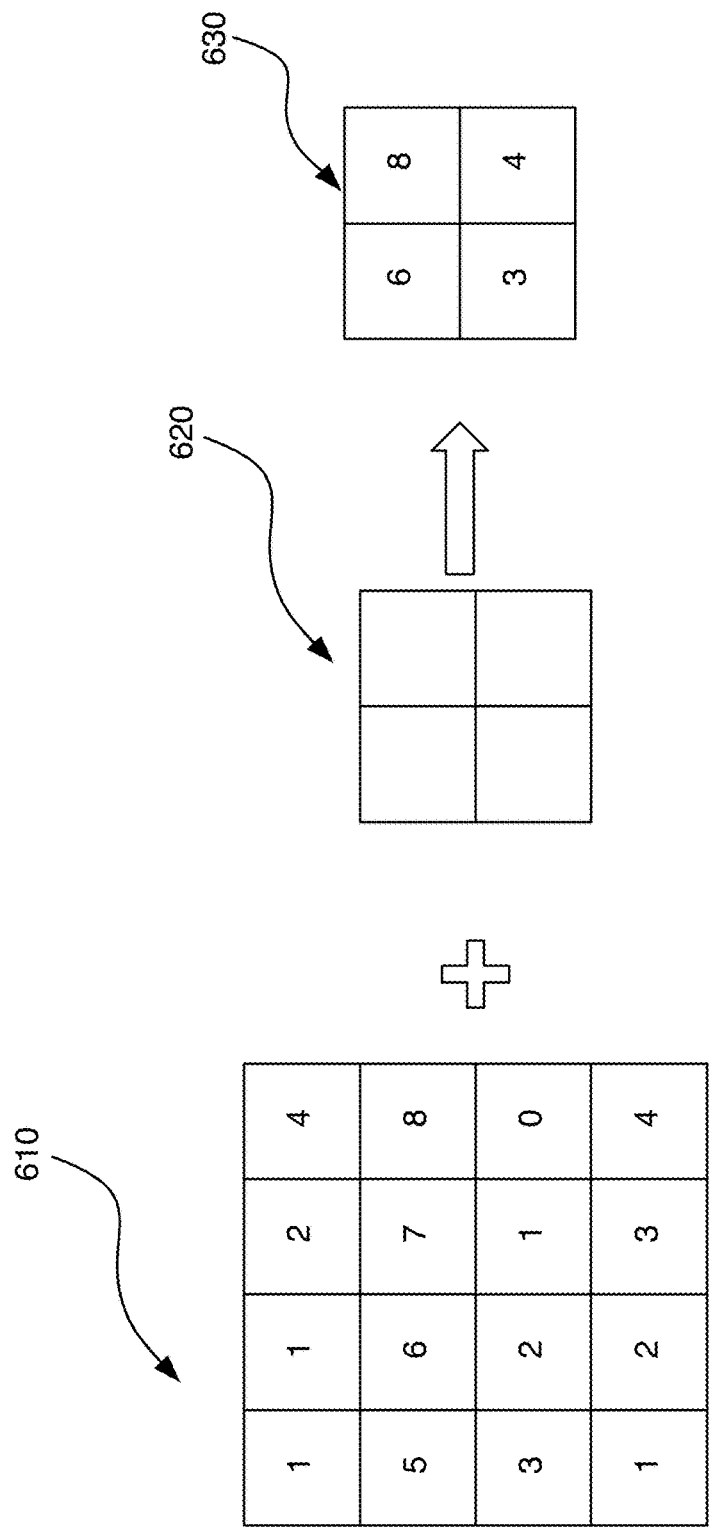
FIG. 6 shows an example of a max pooling.

FIG. 6 shows an example of pooling. A pooling layer reduces the size of the data, (e.g. the activation maps) but retains the most important information. Various pooling techniques are known. One pooling technique is called max filtering or max pooling. This technique outputs the maximum value in a pooling filter. For example, a common pooling filter has a size of 2×2, with a stride 2 and selects the largest element from the rectified feature map within that window. Stated differently, when a 2×2 filter is positioned over the activation map (filtered image), only the maximum value of the 4 pixels considered in the 2×2 filter is placed into the pooled image. Pooling is not sensitive to the actual position of the data in which it is filtering. Pooling a filtered image can greatly reduce the size of the image without a significant loss of data.

As shown in FIG. 6, a 4×4 input image 610 undergoes a max pooling, operation using a 2×2 filter 620, which has a 2-pixel stride or a stride of 2. The resulting filtered output 630 is a 2×2 image containing the max pool values. The original image 610 had a size of 16 pixels and the filtered image 630 has a size of 4 pixels. The filter 620 uses the maximum value of 1 pixel out of 4 pixels and thus the pooling layer with a 2×2 filter with a 2-pixel stride discards 75% of the pixels. Further, the size of the image is reduced by ½. That is, a 224×224 image which undergoes a pooling using a 2×2 filter with a stride of 2, would yield an image with a pixel area size of 112×112. Likewise, an 8×8 image undergoing a pooling using a 2×2 filter with a stride of 2 would yield an image with a pixel area size of 4×4.

Score Pooling

The score pooling layer provides a channel mapping function from the pooling layer to the corresponding up-pooling layer. The score pooling layer can use an output volume of the respective pool layers from different layers in the network, which exist at different scales. The output volumes in the lower layers (e.g. all layers below the final convolutional layer) can help capture finer grain structure in the image, when they are scaled and input into the corresponding up pool layer. This is because the output volume of the lower layers have a smaller receptive field. Thus, the score pooling layers can help with improving the detail of the image, and particularly the boundaries of objects within the image. Thus, determining an influence of the output volume on the semantic segmentation label is determining the impact of realizing the finer structure on the output image. That is, the influence of the output volume is proportional to the semantic segmentation improvement with the additional weighting derived from the output volume of the respective pool layer.

During training, the semantic segmentation results can be measured against the ground truth images and the influence of the output volume can be ascertained.

Recall that the number of channels is also equal to the depth of the volume of the output of the pooling layer. Using the example in FIG. 12, the output of the Pool 2 layer has a volume of 56×56×128. Thus, there are 128 channels in the volume. However, when looking at the corresponding up-pooling layer, Up Pool 2, there are only 2 channels in this layer. The two channels in the layer correspond to wall or non-wall possibility in this example. It is noted that more channels could be used to perform object detection and that is within the scope of invention, but for simplicity, mapping to a 2-channel output will be described.

To properly adjust the number of channels from 128 to 2, the dimensions of the output of the pool volume must be changed and be mapped to the corresponding up-pool layer. An example of how this is done is by using two filters, each having a size of 1×1. Convolution using a 1×1 filter size may initially seem counter-intuitive as the result would appear to simply yield the original input pixel. However, recall that the convolution also occurs over the entire depth/number of channels of the input volume. Thus, in this example, the input volume has 128 channels.

These 1×1 filters are convolved over the pooled feature map, with a convolutional stride of 1, with the resulting output being two feature maps of size 56×56×2. Thus, the channels in the pooled feature map can be reduced to two channels using the above technique. The result from the score pool layer can then be used to weight the up-pool layer, as discussed below.

Up-Pooling with Filter Weight

Figure 7:
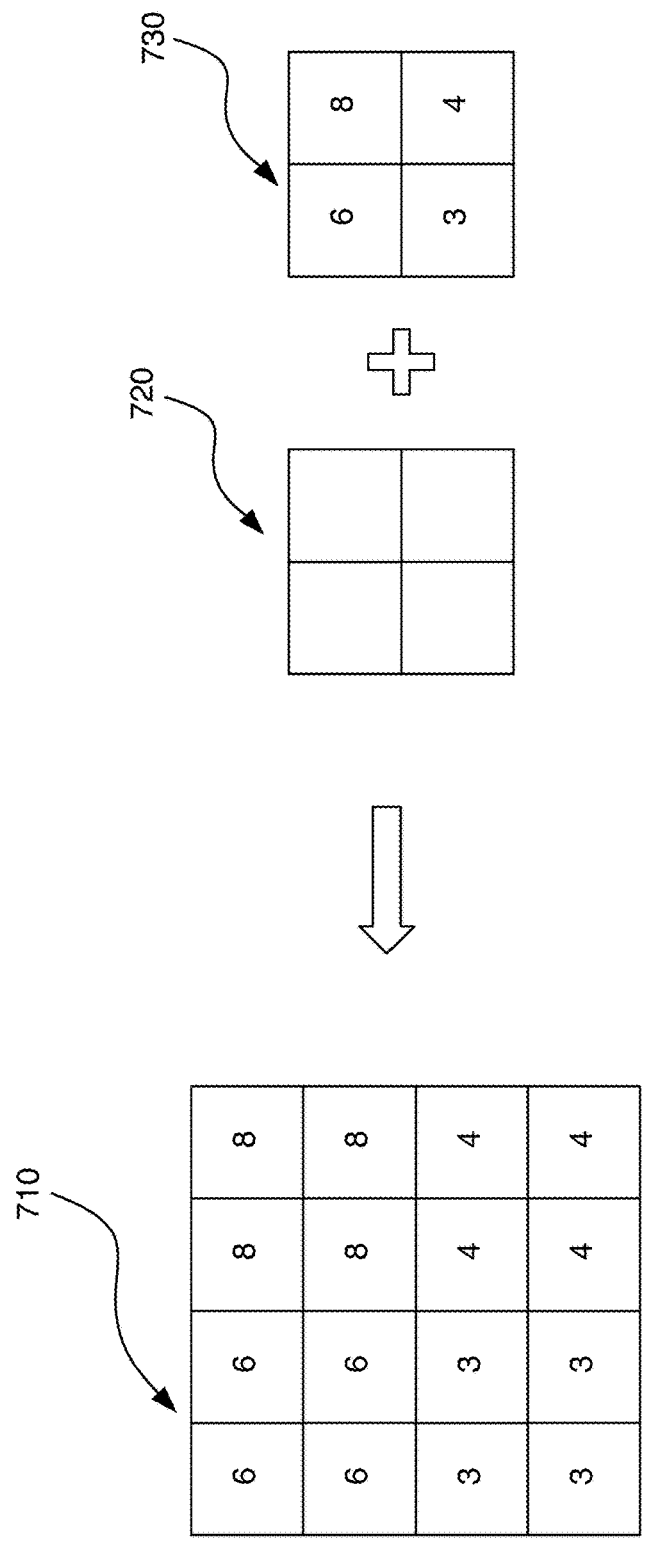
FIG. 7 shows an example of up-pooling.

As noted above, generally up pooling layers serve to increase the processed image size back to the original input volume size. FIG. 7 shows an example of up-pooling, which is also called up-sampling, or deconvolution, or fractional convolution. FIG. 7 shows a simple example without any influence from a score, pooling layer. As shown in FIG. 7, a 2×2 input 730 is scaled to a 4×4 output 710 using a 2×2 filter 720 with a stride of 2. As can be seen, the upper left value 6 of the input volume is propagated to fill an upper left 2×2 volume of the 4×4 output volume. The remaining input values are similarly expanded. In practical application, up pooling can be viewed as effectively a reverse pooling operation. As an example, if a 3×3 filter was used instead, this would result in overlapping regions in the output space. Here the overlapping region values would be added together.

Figure 4:
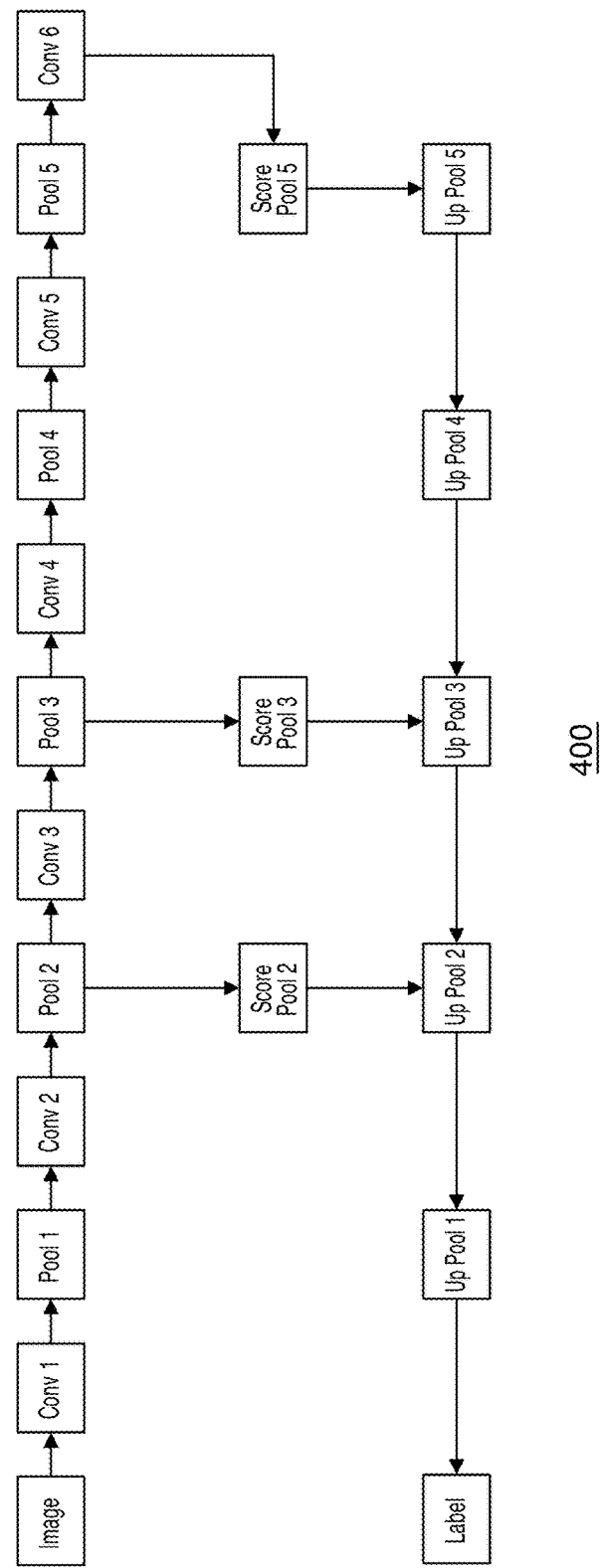
FIG. 4 shows a first embodiment of the invention after training.

Looking at FIG. 4 as an example of up-pooling, the output of the Conv 6 layer is an activation map with a volume of 7×7×4096. The score pool layer 5 then maps that output to 2 channels, wall or non-wall, as discussed in the score pooling section above. Thus, after the mapping of the Score Pool 5 layer, the output of the Score Pool 5 layer is 7×7×2, The area of 7×7 corresponds to the output of the Conv 6 layer and the depth of 2 corresponds to the 2 channels, wall or non-wall needed for the final image configuration and semantic segmentation label. Thus, the input to the Up Pool 5 layer is 7×7×2, The Up Pool 5 layer performs an up-pooling, in this case, a up-poling, and outputs a volume of 14×14×2.

Figure 12:
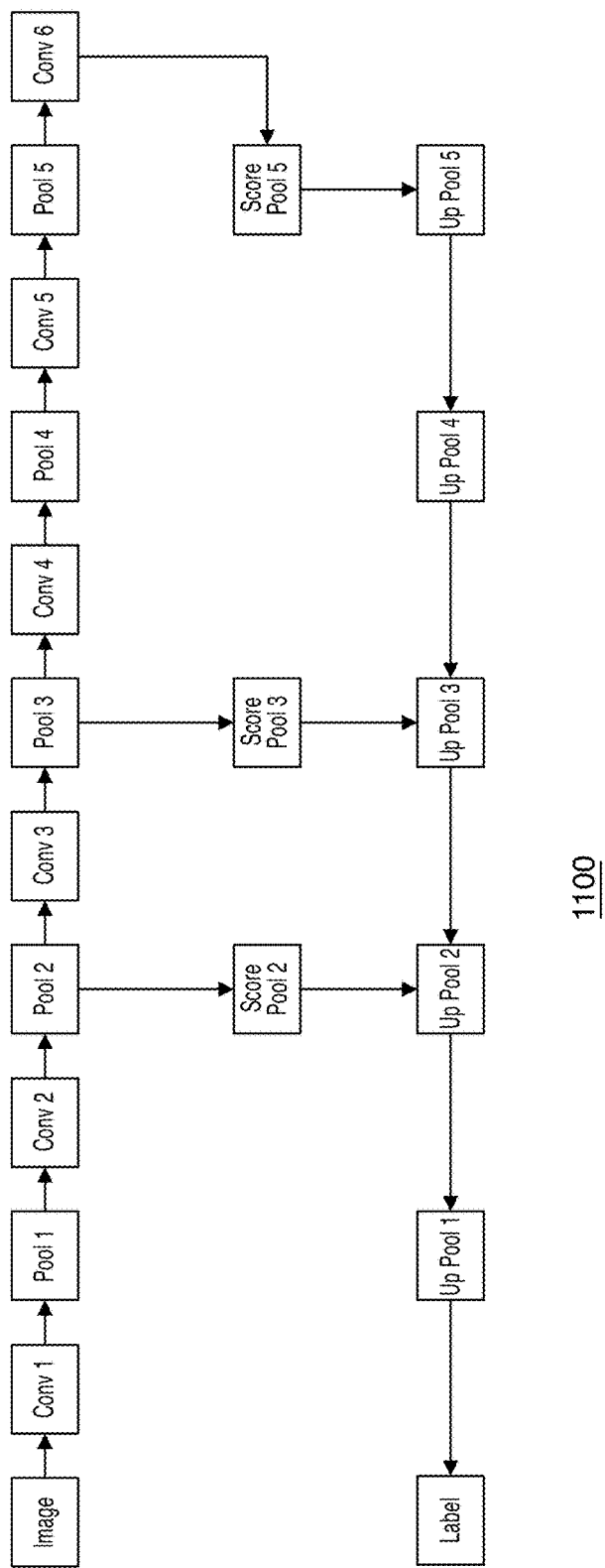
FIG. 12 shows a trained CNN system according to the first embodiment.

In one embodiment, up-pooling also has an additional influence of a weighting factor from the corresponding pool layer. An example of this is shown in FIG. 12. In FIG. 12 the output of the Pool 2 layer and an output of the Pool 3 layer are input to the tip Pool 2 layer and the Up Pool 3 layer, respectively.

If only the output from Conv 6 was used to upscale the image, some of the finer detail points of the image could be lost. That is, the 7×7(×4096) output of the Conv 6 layer could be scaled to once again match the input dimension of the input image, 224×224. However, when intermediate pool layers are used in the up-sampling, more of the finer detail of the image can be captured. That is, more fine, grain information about the locations of features in the image can be ascertained. When looking at the segmented image, this results in the boundaries of the image being sharper and more defined. Thus, it is advantageous to upscale the image in this fashion.

FIG. 8 provides an example of how the upscaling feature can take into account the intermediate pool information. In the example shown in FIG. 8, up-pooling occurs from a 2×2 input 820 and results in a 4×4 output 830. A 3×3 filter window 810 is used with a stride of 2. The 2×2 input 820 has values that gets imparted to the 4×4 output 830. The filter 810 has a scalar or a weight that gets imparted by the 2×2 input 820. Therefore, the 3×3 filter window 810 makes copies of the original input area and imparts a weight based on the 2×2 input 820 as shown in FIG. 8. The scalar weight is simply a multiple of the copied value of the original input area. Thus, each value of the 2×2 input 820 provides a weight for the filter in the deconvolution process.

Going back to the example in FIG. 4, the 56×56×2 output of the Score Pool 2 layer can be weighted to influence the Up Pool 2 layer as follows. In the example in FIG. 4, two convolutional filters, each having a size of 4×4×1 and using a stride of 2 can be used.

Training

Training is an important part of creating a neural network. In the present disclosure, the standard training process for training filter maps also applies. However, in addition to training the CNN system by adjusting the filter maps, the CNN system also finds an additional, variable $\lambda$ through the training process. Variable $\lambda$ is pan of the gate connected to a pooling layer. The training of variable $\lambda$ is discussed below.

The implementation of the training in the present embodiments used a base CNN system architecture as shown in FIG. 3. That is, each of the pool layers included a gate and score pool layer connected to the respective up pool layer. As the training progressed, the architecture of the CNN system began to automatically take shape, until for example as shown in FIG. 4, the gate layers 1 and 4 removed their respective score pool layers; e.g., they were skipped. The effects of this architecture are discussed below.

To train a CNN system as shown in FIG. 4, a set of ground truth images can be divided into three groups: a validation group; a training group; and a test group. The training group can be used to train the filler maps and variable $\lambda$. The validation group can be used to find the validation error as the CNN system is being trained. The test group can be used to test the trained CNN system to determine the accuracy of the CNN system.

For example, the CNN system can be trained until the validation error reaches a certain amount. Alternatively, the CNN system can be trained for a certain number of hours and then the validation error at that point can be measured. Once this error amount, or time limit is reached, then the CNN system can be tested for accuracy. This allows for CNN systems be more easily compared against one another.

Learning Rate

A learning rate determines how quickly changes are made to the filter weights in the training process. A common technique is to use backpropagation/gradient descent and change the filter weights to minimize a loss function. If the learning rate is too high, the filter weight values can take large steps and potentially skip over the weight that provides a minimum cost. However, if the learning rate is too low, the CNN will not be trained quickly. Setting a learning rate of the CNN system is a hyperparameter.

Gate

The role of the gate layer is to let the network structure be automatically optimized during training, since adding more features cannot guarantee better performance. Based on the cost function, discussed below, the training process can decide whether adding another score pool layer could lead to better result.

In FIG. 3, the gates 1 through 4 are, comprised of three principle components: λ, also known as a scale parameter, which is a learned parameter; θ, which determines if a threshold level is met; and p (not shown), which is a hyperparameter and is used in thresholding process.

Every gate in an initial CNN system architecture has a corresponding λ value, which is a parameter that shows the influence of the respective pooling layer on the overall image labeling. θ is a thresholding hyperparameter that provides a threshold to determine if the respective pooling layer has a large enough influence on labeling the image to warrant the computation cost of the channel mapping in the score pool layers and the filter weighting in the up-pooling layers. The hyperparameter p is a value against which λ is measure. The relationship between λ, θ and p is as follows:

$$\theta = \begin{cases} 1 \text{ if } \lambda > p \\ 0 \text{ if } \lambda \leq p \end{cases}$$

If the pool layers have a minor influence, or no influence on the final segmentation label, then the score pooling processing and filter weighting in the up-pooling layer can be eliminated. This elimination of the score pool, layer and the corresponding up pool weighting can reduce computational costs, such as time, memory and processing power. This is especially true during the training process of the CNN system, but also applies to the implemented CNN system after training. For example, a 5% to 20% reduction in training time, and a corresponding reduction in computational costs, has been achieved with the present embodiment.

TABLE 1

| Method | Time Spent Training | Mean Accuracy | Mean Intersection over Union | Jaccard Index |
|---|---|---|---|---|
| CNN Standard | 20 hours | 92.9 | 89.9 | 81.2 |
| CNN Skip 1 | 18 hours | 93.6 | 89.7 | 81.0 |
| CNN Skip 2 | 17 hours | 91.4 | 87.3 | 76.6 |

Table 1 shows three comparative examples of CNN systems. The mean accuracy, mean intersection over union and Jaccard index are all ways of measuring the accuracy of a CNN system. The exact way the accuracy is measured is not discussed in this application, but each evaluation metric measures accuracy in a different way.

In the CNN Standard example, Table 1 shows data from a CNN system which does not implement a skip architecture of the present embodiments. In the CNN Skip 1 example, Table 1 shows data from a CNN system of the present embodiments where the score pool layers 1 and 4 were not implemented as the gate layer stopped implementation. This CNN system architecture is also shown in FIG. 4, for example. The CNN skip 2 example shows data from a CNN system of the present embodiments where the score pool layers 1, 3 and 4 were not implemented as the gate layer stopped implementation.

As shown above in Table 1, the CNN Standard system took 20 hours to train and provides a baseline against which to measure the embodiments of the present invention. The CNN Skip 1 data shows that the training time took only 18 hours and the accuracy results were nearly identical to the CNN Standard system. That is, a 2 hour improvement which equates to a 10% gain in efficiency during the CNN system training was achieved, while maintaining the segmentation accuracy after the CNN system was trained.

One of the reasons for the computation savings is the fewer parameters that need to be processed by the CNN system.

The CNN Skip 2 data shows a CNN system that had a more aggressive gate setting than the CNN Skip 1 system. That is, in the CNN Skip 2 architecture, the gates for the pool layers 1, 3 and 4 were not implemented. This resulted in a faster training time of only 17 hours, but some accuracy was sacrificed, as shown in Table 1.

TABLE 2

| Method | Image Segmentation Time |
|---|---|
| CNN Standard | 0.15 seconds |
| CNN Skip 1 | 0.13 seconds |
| CNN Skip 2 | 0.12 seconds |

Table 2 shows the time it took to output a segmented image for each of the respective CNN systems shown in Table 1. As shown in Table 2, both CNN systems implementing a skip architecture yielded an improved segmentation time. The CNN Skip 1 architecture yielded a faster computation time, saving 0.02 seconds which equates to a 13% faster time than a CNN system without the skip architecture. The CNN Skip 2 architecture yielded a faster computation time of 0.03 seconds which equates to a 20% faster time than a CNN system without the skip architecture.

As mentioned above, $\lambda_i$ is determined in the training phase. $\lambda_i$ is updated over every iteration during back propagation. For each training iteration $\lambda_i$ is updated as:

$$\lambda_i = \lambda_i + \text{learning rate} \times \frac{d}{d\lambda_i} \text{ where } \frac{d}{d\lambda_i}$$

is calculated using gradient descent from top layers with the chain rule. Thus, the λ gradient is multiplied with the learning rate to get the new value of $\lambda_i$. During the training phase of the CNN, $\lambda_i$ is continuously updated over each iteration. $\lambda_i$ will increase or decrease over the course of the training. $\lambda_1$ is initialized at a value of 1, for example, and during backpropagation various $\lambda_i$'s are increased or decreased, for each gate/pool layer, depending on the relevance of the pool layer to the final segmentation label. As the correct segmentation outcome is known during the training phase, the $\lambda_i$ can be back propagated to achieve a better λ value every iteration. This process of determining λ for each gate, by back propagation, is similar to the process of finding the filters to apply in each convolutional layer.

Figure 9:
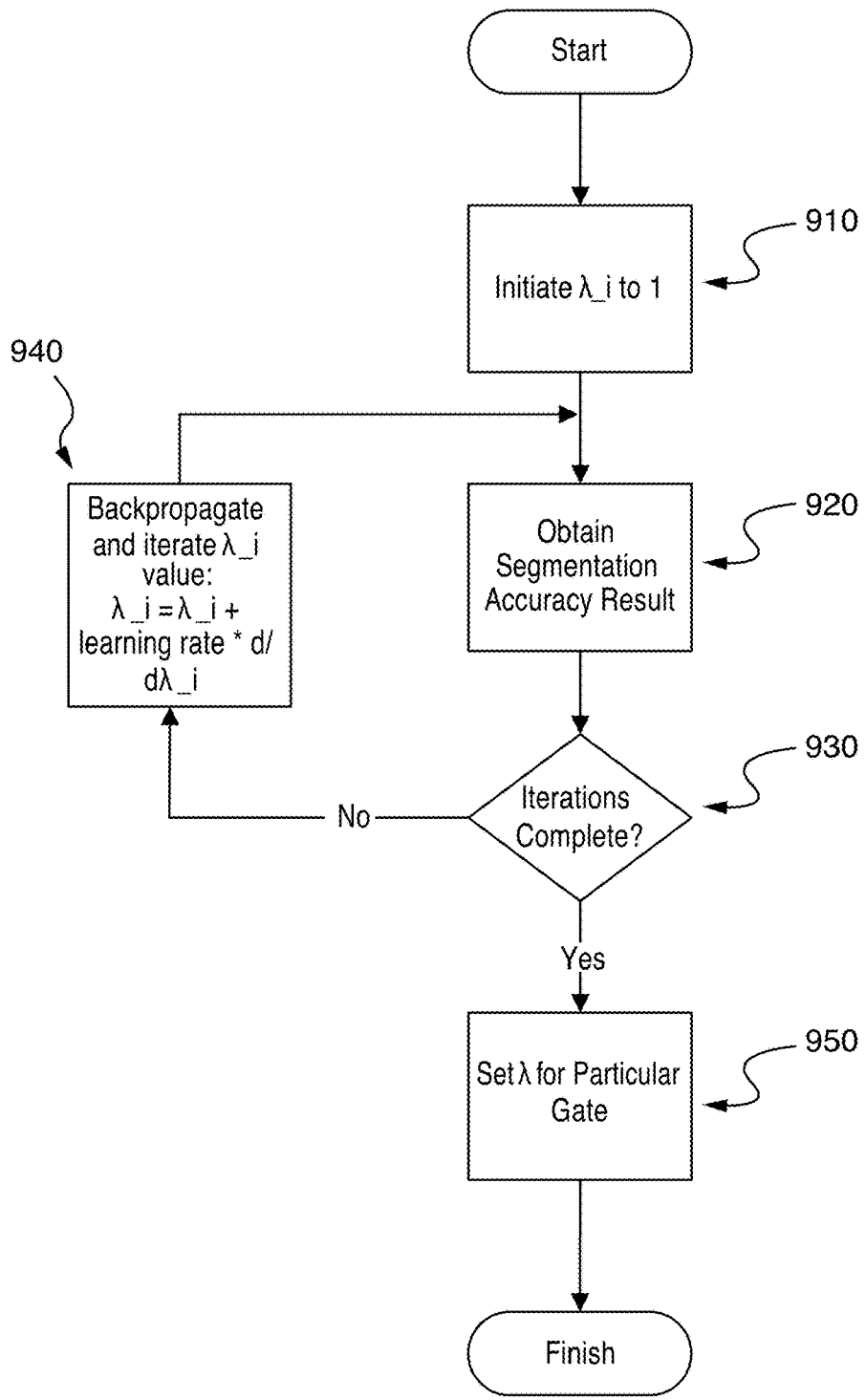
FIG. 9 shows a flowchart on how to determine $\lambda$.

FIG. 9 shows an example of how to determine λ for a given gate. First, λ is initiated to, in step 910. Then the output of the CNN system, with λ set to 1 is checked in step 920. The accuracy of the CNN systems determined in step 920, analyzed using a known method against the ground truth image, such as one of the methods discussed above. Next in step 930, it is determined if the CNN system will undergo another iteration of training. That is, are the iterations of the CNN system complete at step 950. If yes, then the process is finished and the most recent value of λ is set for the particular gate. If no, then λ is incremented according to the formula above in step 940 and the process begins again at step 920. FIG. 9 shows a process for setting one λ at one gate, however each gate will have its own corresponding λ and therefore this process is repeated for every gate.

Figure 10:
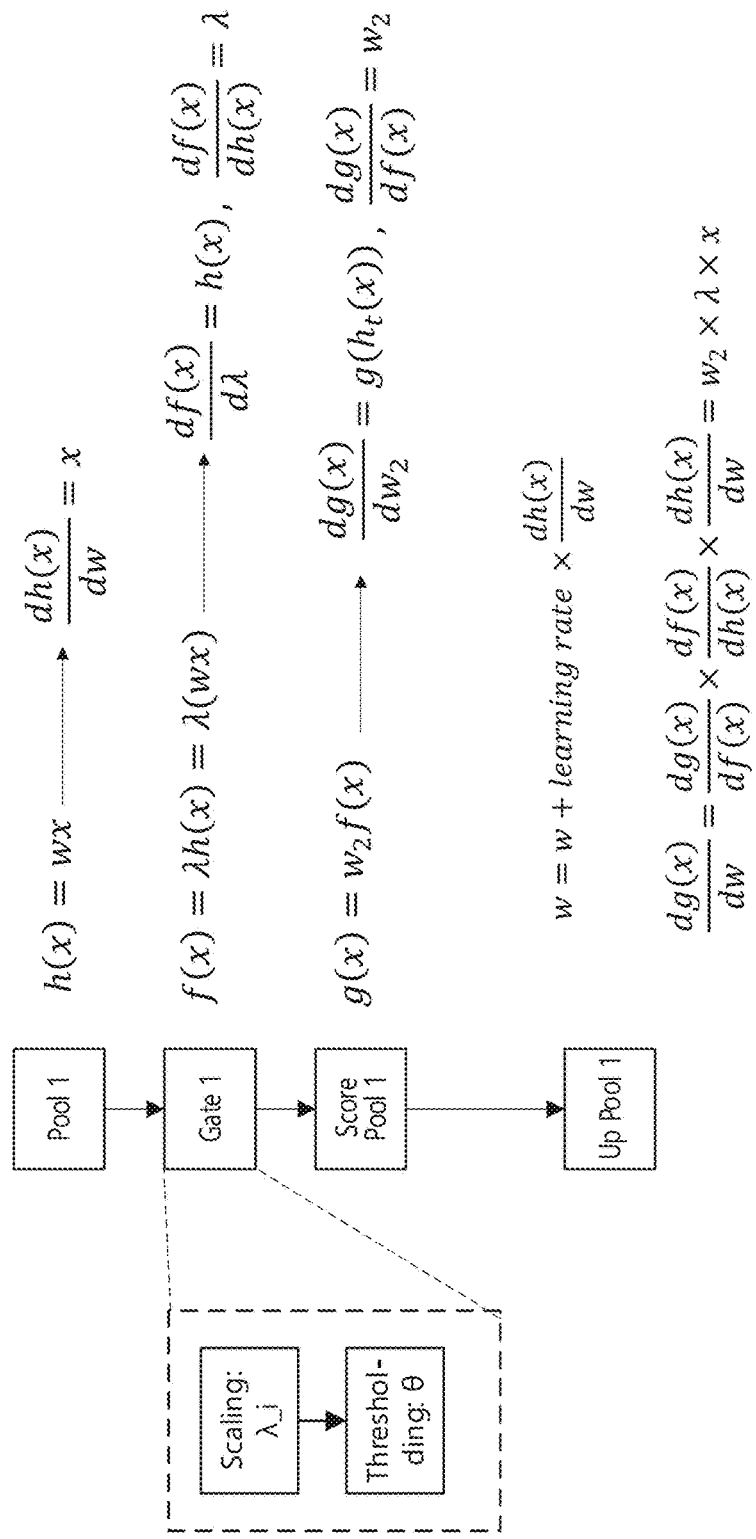
FIG. 10 shows an embodiment of determining a learning rate.

FIG. 10 provides an example of equations that are used in the gate layer. Given an input image, the CNN system first parses the input image into several convolution layers, and each layer computes the function: $h_{t+1}(x)=\max(w_{t+1}h_t(x)+b_{t+1})$, where t is the layer index, b is the bias, and $h_1(x)=X$.

Given a feature vector h(x) with a size of channel c, which is the output of a previous convolution layer, the gate connection takes an h(x) as an input, then feeds the vector into a scaling layer f(x), which contains only one scalar λ, defined as: $f(x)=\lambda h(x)$. For mapping the number of channels to be the same size as the output channel (for example 2 channels). The gate connection then parses the f(x) into another score pool layer g(x) and $g(x)=wf(x)$. Note that no bias is introduced in this layer and the kernel size is 1.

Selecting CNN Architecture

Figure 11:
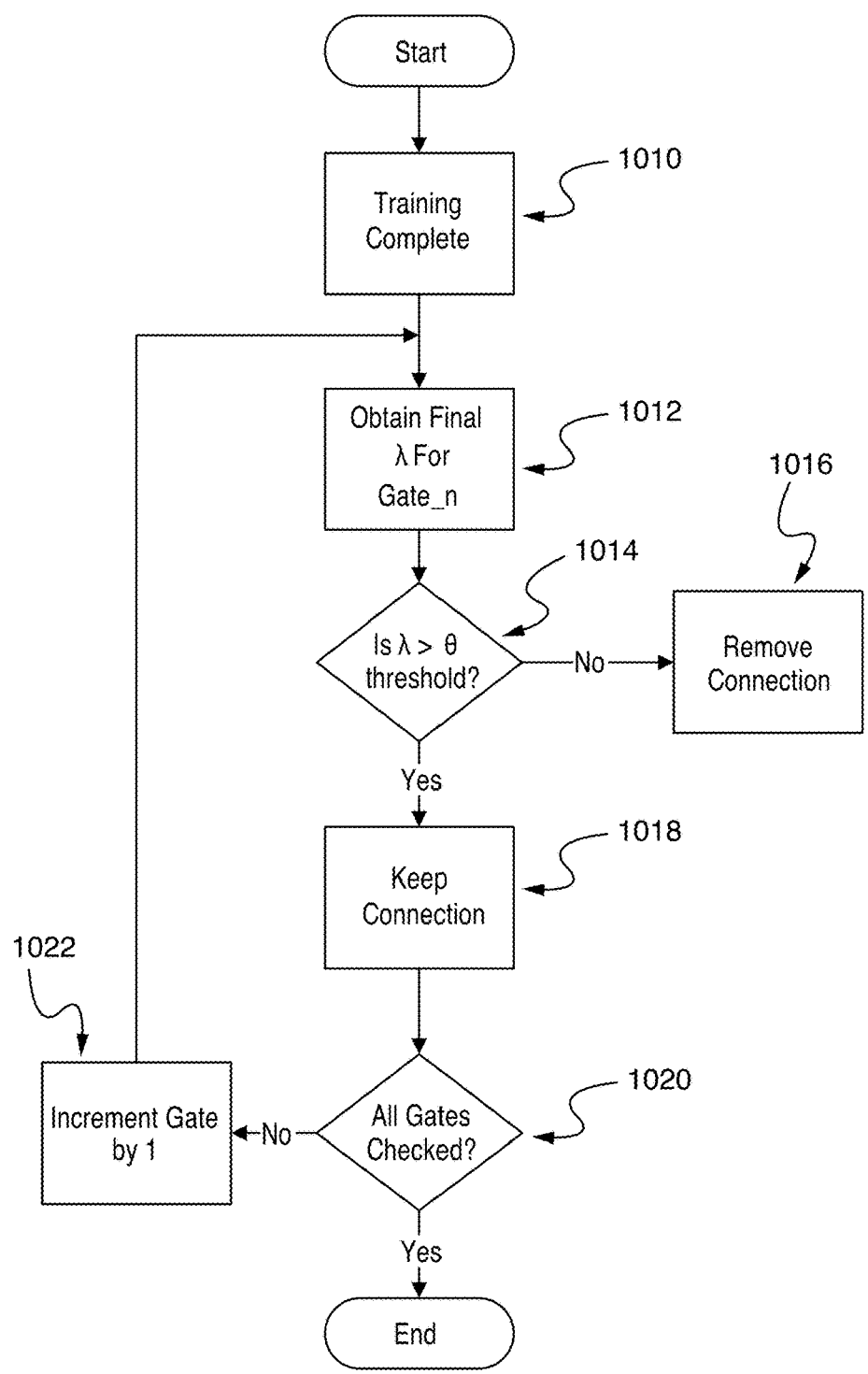
FIG. 11 shows a flowchart of determining a CNN system architecture.

FIG. 11 shows an example of how a CNN system architecture is selected after training of the CNN system is completed. In step 1010, the training of the CNN system is completed and in step 1012 of λ value for a particular gate is acquired. In step 1014, the λ value is compared to the threshold value θ to determine if the λ value of the gate is greater than the threshold value. If the λ value of the gate is not greater than the threshold value θ, then the connection between the particular pool layer and the corresponding up-pool layer is removed in step 1016. If the λ value of the gate is greater than the threshold value theta, then the connection between the respective pool layer and the corresponding up-pool layer is kept in step 1018. This procedure is repeated for every gate. In step 1020 it is determined if all of the gates have been checked. If all of the gates have been checked, then the CNN system architecture is determined and the process stops. If all of the gates have not been checked, then the gate is incremented by 1 in step 1022 and the next gate is checked and the process repeats until all of the gates are checked.

Example

FIG. 12 shows an example of an embodiment of the present invention. The same, components of the CNN system in FIG. 4 are the same as in FIG. 12 and thus will, not be described. In this example, a sample image having a size of 224×224 pixels is input. The input image also has a depth of 3, (or 3 channels), representing 3 dimensions, where each dimension is a primary color of red, blue or green. The depth of the input image is not to be confused with the depth of the network. The goal of the CNN system is to take the input image and perform a semantic segmentation of the image. In this case, the number of labels is set at 2, wall or non-wall.

As shown in FIG. 11, the input image is first input into a convolutional layer, Conv 1. The Conv 1 layer uses a set of 64 filters. Each filter has an area of 3×3 with a depth of 3, (or 3 channels). Thus, the volume of each filter is 3×3×3. The stride is set at 2. Thus, each 3×3 filter is moved across the input image, moving over 2 pixels at a time. The resultant activation map for a particular filter is 224×224×1. This result also includes the addition of using padding pixels, briefly described hereinabove. With a total of 64 filters, this produces a set of activation maps that have a dimension of 224×224×64.

In the next step, a pooling operation is performed in Pool 1. Here a max pooling is applied with a 2×2 filter with a stride of 2. As discussed above, the resulting output has a 50% reduction in size in the x and y dimensions (i.e. 224×224 to 112×112) and achieves a 75% reduction in parameters (i.e. 50,176 to 12,544). Note that the depth/number of channels remains the same as the pooling layer operates on each individual activation map and thus the number of activation maps before and after the pooling operation are identical. Thus, the output of the pooling layer Pool 1 has 64 channels and the total dimensions of the output of the Pool 1 is 112×112×64, which equals a total of 802,816 parameters.

As discussed above, a gate layer can control whether the influence of the pooling layer and its scaling factor, will be applied to the respective up-pooling layer. In the present example, based on the training of the CNN system, the Pool 1 layer does not have enough of an influence over the segmentation result and the Score Pool 1 layer was removed. As indicated above, by removing the Score Pool 1 layer, this reduces the computational cost of determining the semantic segmentation without overly sacrificing on the quality of the semantic output.

The output of the Pool 1 layer is input into the Conv 2 layer. The convolutional process of the Conv 2 layer and the Conv 1 layer work in exactly the same manner. The Conv 2 layer uses a set of 128 filters. Each filter has an area of 3×3, with 64 channels. Note, that as mentioned above, the depth of the filter must match the depth of the input volume. Here, the input volume depth is 64. Therefore, the depth of the filters in the Conv 2 layer must also be 64. Thus, the volume of each filter is 3×3×64. The stride is set at 2. Thus, each 3×3 filter is moved across the input image, moving over 2 pixels at a time. The resultant activation map for a particular filter is 224×224×1. This result also includes the addition of using padding pixels, briefly described hereinabove. With a total of 64 filters, this produces a set of activation maps that have a dimension of 224×224×64, for a total number of parameters of 3,211,264.

The output of Conv 2 is input to the pooling layer Pool 2. The Pool 2 layer operates in exactly the same manner as Pool 1. Here a max pooling is applied with a 2×2 filter with a stride of 2. As discussed above, the resulting output has a 50% reduction in size in the x and y dimensions (i.e. 112×112 to 56×56) and achieves a 7% reduction in parameters (i.e. 12,544 to 3,136). Note that the depth remains the same as the pooling layer operates on each individual activation map and thus the number of activation maps before and after the pooling operation are identical. Thus, the output of the pooling layer Pool 2 has a depth/number of channels of 128 and the total dimensions of the output of the Pool 2 is 56×56×128, which equals a total, of 401,408 parameters.

The output of Pool 2 is input into the Score Pool 2 layer. Note that there is not any gate in between the Pool 2 layer and the Score Pool 2 layer. This is because during the training process, the gates already determined the most efficient CNN system architecture. That is, the gates determined which pool layers had a large enough influence over the segmentation output to justify the computational cost. In the present example, as mentioned above, the Pool 1 layer did not have a significant enough influence over the segmentation label to justify the additional computational cost of calculating the score pool layer and inputting it to the corresponding up-pool layer.

However, the Pool 2 layer did have a significant enough influence over the semantic segmentation label to justify the additional computational expense and therefore, the output of the Pool 2 layer is also input into the Score Pool 2 layer.

The scoring, pool layers will be discussed below when the up-pooling layers are discussed.

The rest of the convolutional layers Conv 3, Conv 4, Conv 5 and Conv 6 work in the same fashion as the Conv 1 and Conv 2 layers discussed above. Further, the rest of the pooling layers Pool 3, Pool 4 and Pool 5, work in the same fashion as the Pool 1 and Pool 2 layers discussed above.

Convolutional layer 3, Conv 3, has a volume of 56×56× 256 and pooling layer Pool 3 has a volume of 28×28×256. Conv 4 has a volume of 28×28×512 and Pool 4 has a volume of 14×14×512, Conv 5 has a volume of 14×14×512 and Pool 5 has a volume of 7×7×512. Conv 6 has a volume of 7×7×4096.

The output of the Conv 6 layer is input into a scoring pool layer, Score Pool 5. The score pool layer provides a weighting factor to an up-pooling layer (or an up-sampling layer). The up-pooling layer is a learnable layer and the learnable input comes from the score pool layer. One object of the up-pooling layer is to up-sample the image in an x and y direction so that it ultimately matches the size of the input image in the x and y direction. In the example of FIG. 12, the image size has been reduced to 7 with a depth/number of channels of 4096, whereas the original image was 224×224, with a depth/number of channels of 3.

Returning to FIG. 12, the output of the Score Pool 5 layer has a depth/number of channels of 2, i.e. 2 channels, wall or non-wall, as discussed in the score pooling section. Thus, after the mapping by the Score Pool 5 layer, the output of the Score Pool 5 layer would be 7×7×2. The area of 7×7 corresponds to the output, of the Conv 6 layer and the depth/number; of channels of 2 corresponds to the 2 channels, wall or non-wall needed for the final image configuration and semantic segmentation label. The Score Pool 5 layer takes the activation map of the Conv 6 layer, which has a volume of 7×7×4096 and reduces it to a volume of 7×7×2. Thus, the input to the Up Pool 5 layer is 7×7×2. The Up Pool 5 layer performs up-pooling, in this case 2× up-pooling as discussed above, and outputs a volume of 14×14×2.

In the Up Pool 4 layer, another 2× up-pooling is performed. In essence, this can also be viewed as simply up-pooling 4× in the Up Pool 5 layer. The output of the Up Pool 4 layer is a volume of 28×28×2. Again, the depth/number of channels of 2 is maintained and represents the two channels, wall or no-wall. The input size of 14×14 has been doubled to 28×28. The Score Pool 4 layer is input to the Up Pool 4 layer and has a volume of 14×14×2.

The reason there is no scoring layer to influence the up-pooling layer is that during the training phase the architecture of the CNN system was set and Gate 4 determined that the influence of the Pool 4 layer on the ultimate semantic segmentation label was not worth the computation cost. Therefore, the Score Pool 4 layer was deleted and computational cost was saved.

The output of the Up Pool 4 layer is input to the Up Pool 3 layer. The Up Pool 3 layer performs up-pooling, including using the weights from Score Pool 3, to provide an output volume twice the size of the input. The Score Pool 3 layer has a volume of 28×2×2. Two streams were fused within the network: a pooling layer, and a deconvolutional layer. To do this, the sizes and outputs of the layers being fused must be consistent. For a description of how this is done, please refer to the score pooling description and up-pooling description above. The output volume of the Up Pool 3 layer is 56×56× 2.

The up-pooling process is repeated two more times in the Up Pool 2 layer and the Up Pool 1 layer.

These two up-pooling layers work in the same fashion as the previous up-pooling layers discussed above. Up-pooling layer, Up Pool 2, has an area of 112×112 and up-pooling layer Up Pool 1 has an area of 224×224. Each of these up-pooling layers has a depth/number of channels of 2, corresponding to the channels of wall and non-wall.

Further, the Score Pool 2 layer has an output volume of 56×56×2 and the Score Pool 1 layer has an output volume of 112×112×2.

Finally, a fully connected layer was used after the Up Pool 1 layer to determine the label of every pixel in the output image, wall or non-wall. The output is a probabilistic representation of the likelihood of a given channel being correct, based on the weights of the CNN system. For example, a given pixel could be 90% likely to be a wall and 10% likely to be a non-wall. While one output of the CNN system is simply the most likely pixel label, another e complete output of the CNN system is to provide the probabilistic segmentation result for every pixel and every label.

It is noted that for ease of understanding, only two channels were discussed in the example, wall or non-wall. In practice, many channels could be used and in a floorplan image, channels such as wall, room, door, window, outside, room door, sliding door, closet door, etc. can be used. The output of such a CNN system could be as follows wall 60%, room 30%, outside 5%, room door 1% sliding door 1%, closet door 3%.

The example in FIG. 12 was trained by stochastic gradient descent with momentum (value 0.9, weight decay of $5^{-4}$) and a batch size of 1.

To find the best stride value, the CNN system architecture for different final stride layers was compared. Starting with a FCN-32s with a 32 pixel stride, initialized with VFF-16 parameters, each model is initialized with the parameters of the previous one. The learning rate was set to $10^{-11}$. This value was chosen by running two training procedures with different learning rates for 10 epochs and choosing the rate that reduces the error more rapidly.

Evaluation of CNN Example

For evaluation of the CNN system of the present disclosure, a dataset of 500 floor plan images was gathered from a public real estate website. This image training dataset contained images of different sizes, with side lengths in the range of 156 to 1427 pixels. The images were a tool for real-estate agents and illustrated some degree of artistic freedom in floorplan depictions such as the use of different color and shading schemes and decorative elements. Compared with other public image datasets, this image dataset exhibited a significant amount of variation. FIGS. 6A, 6B and 6C show example images input into the trained CNN system of the present invention alongside the corresponding segmented image output by the CNN system and the created ground truth image. As shown in the figures, the segmented images of the present CNN system closely matched that of the ground truth image.

Figure 13A:
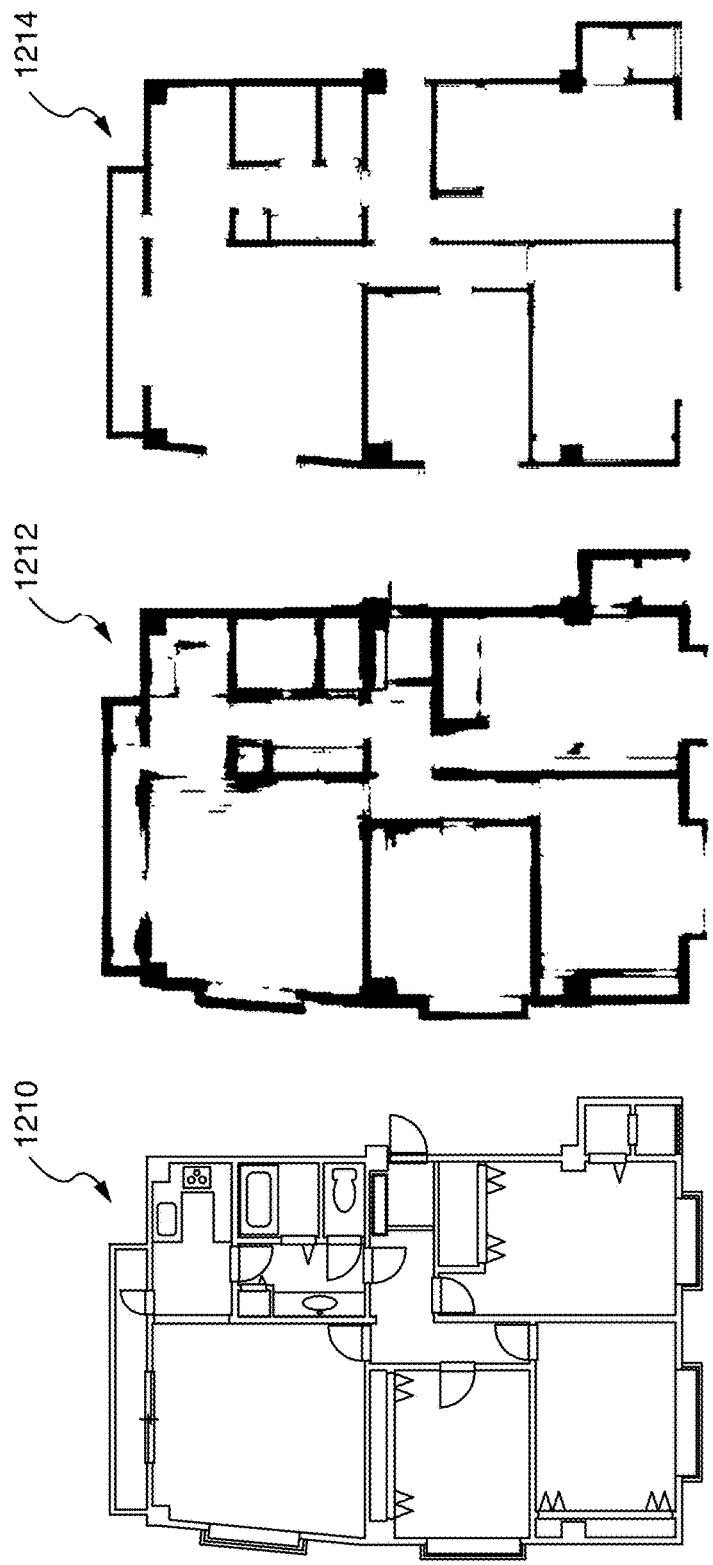
FIG. 13A shows a segmentation result according the trained CNN system of the first embodiment.

FIG. 13A shows a floorplan image that was tested using the trained CNN system in the example. The floorplan image 1210 was input into the trained CNN system and the segmented image 1212 was output. The floorplan image was a real image used in real estate and is typical of these types of floorplan images. As seen in the figures, the segmented image is very similar to the ground truth image 1214, which is the ideal answer.

Figure 13B:
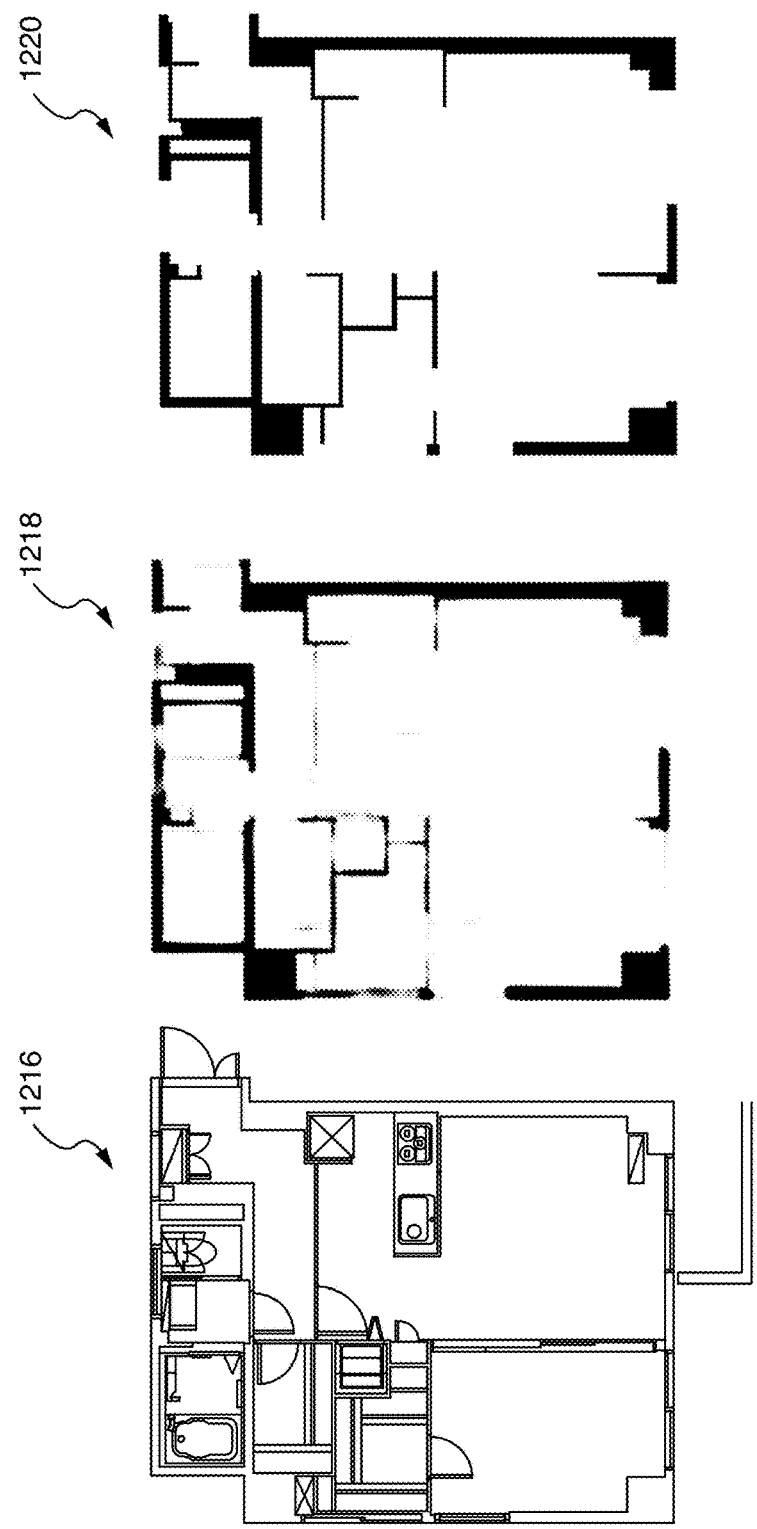
FIG. 13B shows a segmentation result according the trained CNN system of the first embodiment.

FIG. 13B shows a floorplan it rage that was tested using the trained CNN system in the example. The floorplan image 1216 was input into the trained CNN system and the segmented image 1218 was output. The floorplan image was a real image used in real estate and is typical of these types of floorplan images. As seen in the figures, the segmented image is very similar to the ground truth image 1220, which is the ideal answer.

Figure 13C:
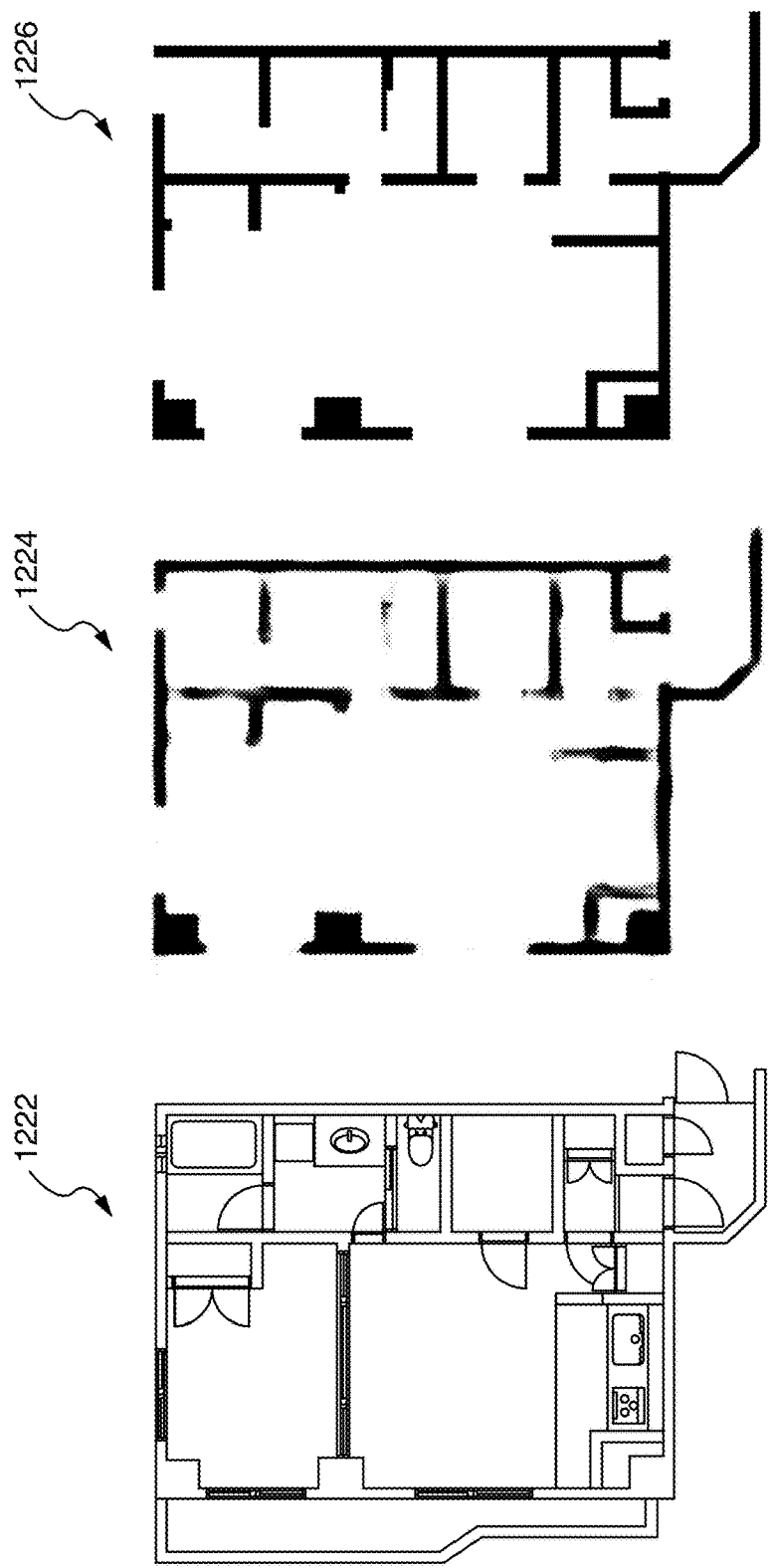
FIG. 13C shows a segmentation result according the trained CNN system of the first embodiment.

FIG. 13C shows a floorplan image that was tested using the trained CNN system in the example. The floorplan image 1222 was input into the trained CNN system and the segmented image 1224 was output. The floorplan image was a real image used in real estate and is typical of these types of floorplan images. As seen in the figures, the segmented image is very similar to the ground truth image 1226, which is the ideal answer.

Figure 14:
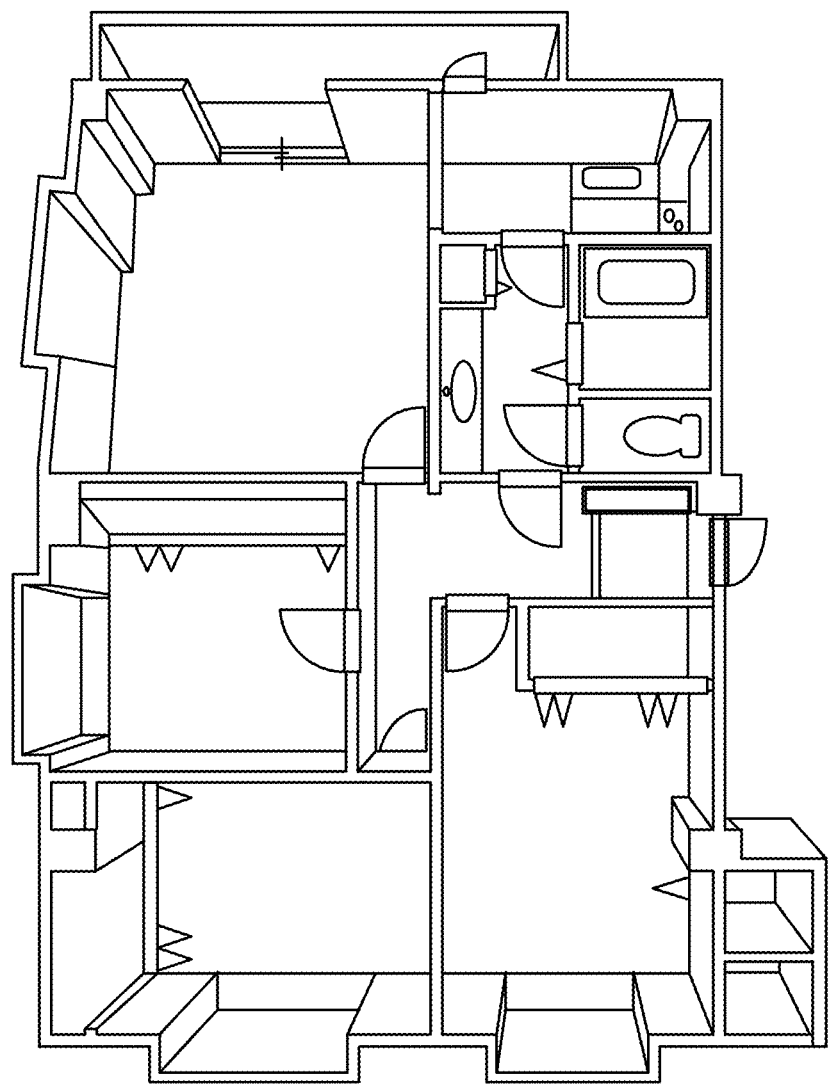
FIG. 14 shows a three-dimensional floorplan according to an embodiment of the invention.

FIG. 14 shows an embodiment of the invention where a segmented floorplan image, output using the CNN system architecture selection method discussed above, is rendered into a three dimensional floorplan image. This rendering from a two-dimensional image into a three-dimensional image can be performed using three-dimensional rendering software. Briefly, once a floor plan image is processed and wall segmentation is reliably known, a wall height value is selected. To create the 3D model rendering, the wall segmentation result is treated as an elevation map where all of the walls are rendered with a common height as is shown in FIG. 13. As seen from the figure, the segmented walls labeled in the CNN system are transformed into a three-dimensional floorplan.

In the present disclosure, a computational device implementing the CNN system, such as a smart phone, personal computer, server computer, image processing computer, etc. may perform the features improving image segmentation.

Hardware

Figure 15:
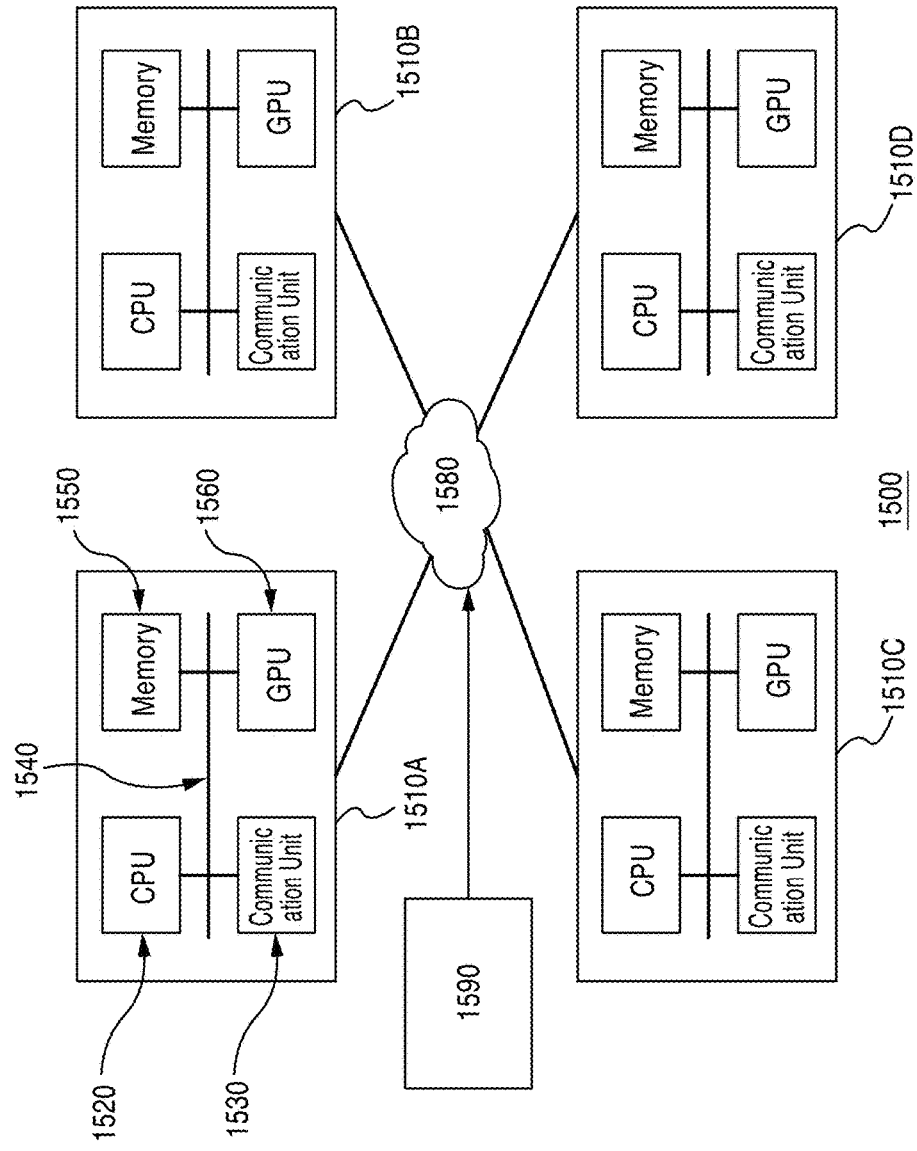
FIG. 15 shows an example of hardware which can be used to run a CNN system.

FIG. 15 illustrates an example of a device that can run the CNN system of the present invention. A CNN system can be implemented on a computer, mobile device or any, processing platform. CNN's can run in website browsers, mobile phone applications, large scalable networks, etc. Although typically thought of as requiring a high processing load, a pre-trained CNN system can often compute segmentation outputs on home computing systems and mobile device. Of course, training a CNN system can sometimes take days or weeks, depending on a multitude of factors such as the network depth, filter size, input image size, etc.

FIG. 15 is a diagram of example components of computing devices 1510 which may be used to implement various computer devices of the network system adapted to analyze images described herein.

Various computing devices may be used to implement the systems and methods described in this document, as either a client or as a server or plurality of servers. Computing devices re intended to represent various forms of digital computers, such as laptops, desktops, workstations, personal digital assistants, servers, blade servers, mainframes, and other appropriate computers. Other computing devices may include various forms of mobile devices, such as personal digital assistants, cellular telephones, smartphones, and other similar computing devices. The components shown here, their connections and relationships, and their functions, are meant to be examples only, and are not meant to limit embodiments of the inventions described and/or claimed in this document.

Each of the components of the computing devices 1510 are interconnected using various busses, and may be mounted on a common board or in other manners as appropriate. The processor can process instructions for execution within the computing device, including instructions stored in the memory or on the storage device to display graphical information on a display. The output of the CNN system on the computer device 1510 may be shown on a display, transmitted to another computing device, used in a three-dimensional rendering, used in another machine, etc. In other embodiments, multiple processors and/or multiple buses may be used, as appropriate, along with multiple memories and types of memory. Also, multiple computing devices may be interconnected, with each device providing portions of the necessary operations (e.g., as a server bank, a group of blade servers, or a multi-processor system).

The processor may be implemented as a chipset of chips that include separate and multiple analog and digital processors. Additionally, the processor may be implemented using any of several architectures. For example, the processor may be an x86 processor, RISC (Reduced Instruction Set Computers) processor. The processor may coordinate with the other components of the device, such as control of user interfaces, applications run by the device, and wireless communication. Multiple processors or processors with multiple cores may also be used.

The processor may communicate with a user through a control interface and display interface coupled to a display. The display may be, for example, an LED (Liquid Crystal Display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

In general, deeper CNN's with more parameters perform better on computer systems with high processing power and a large, amount of cache memory. Computer systems with a large amount of parallel processing power, such as GPU's, tend to be much faster than single processors. GPU's are discussed in more detail below.

Specifically, in image processing applications a GPU (Graphic Processing Unit) that is computationally more powerful than a CPU may be used. In practice a set of 10's, 100's or 1000's of GPUs are used to more quickly compute the vast amount of information. A GPU typically includes processors and a common memory. The processors respectively acquire data efficiently from the common memory, and perform arithmetic processing by executing a common program. An example of a GPU that can be used is a GeForce 1080 GPU.

Multiple computation units 1510A. 1510B, 1510C and 1510D are shown. The improved segmentation device is not limited to this specific configuration, but may be a single computer or many computers. Likewise, the improved segmentation device may include multiple parallel CPU's or GPU's or a combination thereof. The improved segmentation device 1500 includes a CPU 1520, memory 1550, communication unit 1530, parallel computing device 1560, and a bus 1540. The improved segmentation device 1500 may also have a display, not shown, which outputs a segmentation result, which can be in the form of an image, or a probably of each pixel's semantic determination.

Input to the segmentation device 1500 may be done with a personal computer, server, or other computing device 1590.

The CPU 1520 operates according to a program stored in memory 1550. The CPU 1520 controls the communication unit 1530 and the parallel computing device 1560. The program may be provided through the network 1580 such as the Internet, or provided by being stored in a computer-readable information storage medium such as a DVD-ROM or a USB memory.

The memory 1550 includes, for example, a memory device such as a RAM or a ROM, and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520, and sends the information to other devices.

The bus 1540 is configured to send or receive data with the CPU 1520, memory 1550, the communication unit 1530, and the parallel computing device 1560. For example, the CPU 1520 or memory 1550 is connected to the parallel computing device 1560 through an expansion bus in the bus 1540.

The parallel computing device 1560 is hardware good at performing a large amount of the same type of the computation by parallel computation. The parallel computing device 1560 is, for example, a GPU. The parallel computing device 1560 includes parallel processors units and an in-device memory. Each parallel execution unit includes plurality of processors, an instruction unit, and a high-speed memory, for example.

Each parallel processor performs floating-point computation and reading or writing data with the in-device memory and the high-speed memory. The instruction unit causes the parallel processor, which are included in the parallel execution unit including the instruction unit, to perform processing based on a program stored in the in-device memory etc. The parallel processor included in one of the parallel execution units process the same instruction according to an instruction from the instruction unit included in such parallel execution unit. In this way, a plurality of parallel processors can be controlled by one instruction unit, thereby suppressing an increase in circuit size of the instruction unit. As such, it is possible to increase the number of the parallel processors included in the parallel computing device 1560 compared to a case of the CPU 1520.

The in-device memory can be composed of a DRAM. The in-device memory is connected to the CPU 1520 and the memory 1550 through the bus 1540. The parallel computing device 1560 also includes a circuit for transferring data, between the in-device memory and memory 1550 via a DMA transfer. The high-speed memory is composed of, for example, a SRAM that is capable of higher speed access than the in-device memory. Each of the in-device memory and the high-speed memory is a common memory accessible from the parallel processors of the GPU 1560.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternate implementations are possible. Some process steps may be executed in different order from the specific description herein based on, for example, considerations of function, purpose, conformance to standard, legacy structure, user interface design, and the like.

A number of embodiments of the invention have been described. It should be understood that various modifications may be made without departing from the spirit and scope of the invention. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

We claim:

1. A method of using a computer to semantically segment an image using a convolutional neural network system comprising:
a processor configured to:
convolve an input image with a first plurality of filters and output a first output volume by a first convolutional layer;
pool the first output volume and create a first activation map by a first pool layer;
convolve the first output volume with a second plurality of filters and output a second output volume by a second convolutional layer;
pool the second output volume and create a second activation map by a second pool layer;
create weighting coefficients using the first activation map;
create weighting coefficients using the second activation map;
up-pool the second activation map;
up-pool the first activation map and apply the weighting coefficients to form output image;
output a probabilistic segmentation result, labeling each pixel's probability that it is a particular label;
determine the level of influence of the weighting coefficients on the semantic segmentation;
wherein the determination of the level of influence of the weighting coefficients on the semantic segmentation is performed using a gate layer that is positioned between a pooling layer and an up-pooling layer.

2. The method of claim 1, wherein the gate layer comprises a thresholding circuit, which determines if the weighting coefficients have an influence over the semantic segmentation beyond a threshold amount.

3. The method of claim 2, wherein if the weighting coefficients are determined to have an influence over the semantic segmentation of less than the threshold amount, then the gate layer does not allow the weighting coefficients to be calculated an input to the corresponding up-pooling layer, and removes a connection between the first pool layer and the first up-pooling layer.

4. The method of claim 2, wherein if the weighting coefficients are determined to have an influence over the semantic segmentation of more than a threshold amount, then the gate layer allows the weighting coefficients to be calculated and input to the corresponding up-pooling layer.

5. The method according to claim 1, wherein the level of influence of the weighting coefficients are determined by calculating a $\lambda$ value, which is a learned parameter determined during a training process.

6. The method according to claim 5, wherein each pool layer has a corresponding gate layer, and each gate layer has a unique $\lambda$ value.

7. The method according to claim 5, wherein each of the $\lambda$ values is determined by using backpropagation.

8. The method according to claim 1, wherein the output image has a same number of pixels as the input image.

9. The method according to claim 8, wherein the weighting coefficients provide a more detailed output image.

10. The method according to claim 9, wherein the weighting coefficients are created for each activation map.

11. A semantic image segmenting system comprising:
a processor,
a memory,
wherein the processor is configured to:
convolve an input image with a first plurality of filters and output a first output volume by a first convolutional layer;
pool the first output volume and create a first activation map by a first pool layer;
convolve the first output volume with a second plurality of filters and output a second output volume by a second convolutional layer;
pool the second output volume and create a second activation map by a second pool layer;
create weighting coefficients using the first activation map;
create weighting coefficients using the second activation map;
up-pool the second activation map;
up-pool the first activation map and apply the weighting coefficients to form an output image;
output a probabilistic segmentation result, labeling each pixel's probability that it is a particular label;
determine the level of influence of the weighting coefficients on the semantic segmentation;
wherein the determination of the level of influence of the weighting coefficients on the semantic segmentation is done using a gate layer that is positioned between a pooling layer and an up-pooling layer.

12. The system of claim 11, wherein the gate layer comprises a thresholding circuit, which is configured to determine if the weighting coefficients have an influence over the semantic segmentation beyond a threshold amount.

13. The system of claim 12, wherein if the weighting coefficients are determined to have an influence over the semantic segmentation of less than the threshold amount, the processor is configured to prevent the gate layer from allowing the weighting coefficients to be calculated an input to the corresponding up-pooling layer, and removes a connection between the first pool layer and the first up-pooling layer.

14. The system of claim 12, wherein if the weighting coefficients are determined to have an influence over the semantic segmentation of more than a threshold amount, the processor is configured to have the gate layer allow the weighting coefficients to be calculated an input to the corresponding up-pooling layer.

15. The system according to claim 11, wherein the level of influence of the weighting coefficients are determined by calculating a $\lambda$ value, which is a learned parameter determined during a training process.

16. The system according to claim 15, wherein each pool layer has a corresponding gate layer, and each gate layer has a unique $\lambda$ value.

17. The system according to claim 15, wherein each $\lambda$ value is determined by using backpropagation.

18. The system according to claim 11, wherein the output image has a same number of pixels as the input image.

19. The system according to claim 18, wherein the weighting coefficients provide a more detailed output image.

20. The system according to claim 19, wherein weighting coefficients are created for each activation map.

* * * * *